US011827834B2

(12) United States Patent
Poole et al.

(10) Patent No.: US 11,827,834 B2
(45) Date of Patent: Nov. 28, 2023

(54) THERMAL PUMP REFRIGERANTS

(71) Applicant: RPL Holdings Limited, Altrincham (GB)

(72) Inventors: John Edward Poole, Altrincham (GB); Richard Llewellyn Powell, York (GB)

(73) Assignee: RPL Holdings Limited, Altrincham (GB)

( * ) Notice: Subject to any disclaimer, the term of this patent is extended or adjusted under 35 U.S.C. 154(b) by 0 days.

(21) Appl. No.: 17/451,777

(22) Filed: Oct. 21, 2021

(65) Prior Publication Data

US 2022/0162489 A1 May 26, 2022

(30) Foreign Application Priority Data

Oct. 22, 2020 (EP) ..................................... 20203466
Mar. 11, 2021 (GB) ..................................... 2103406

(51) Int. Cl.
*C09K 5/04* (2006.01)

(52) U.S. Cl.
CPC ........ *C09K 5/045* (2013.01); *C09K 2205/106* (2013.01)

(58) Field of Classification Search
CPC .............. C09K 5/045; C09K 2205/106; C09K 2205/126
USPC ......................................................... 252/67
See application file for complete search history.

(56) References Cited

U.S. PATENT DOCUMENTS

| | | |
|---|---|---|
| 4,138,855 A | 2/1979 | Jahan et al. |
| 4,198,313 A | 4/1980 | Bargigia et al. |
| 4,272,960 A | 6/1981 | Wahl, III |
| 4,303,536 A | 12/1981 | Orfeo et al. |
| 4,482,465 A | 11/1984 | Gray |
| 4,810,403 A | 3/1989 | Bivens et al. |
| 4,941,986 A | 7/1990 | Jolly |
| 4,944,890 A | 7/1990 | Deeb et al. |
| 5,026,497 A | 6/1991 | Merchant |
| 5,080,823 A | 1/1992 | Arnaud et al. |
| 5,108,637 A | 4/1992 | Pearson |
| 5,182,040 A | 1/1993 | Bartlett et al. |
| 5,185,094 A | 2/1993 | Shiflett |
| 5,304,320 A | 4/1994 | Barthelemy et al. |
| 5,360,566 A | 11/1994 | Stevenson |
| 5,370,812 A | 12/1994 | Brown |
| 5,417,871 A | 5/1995 | Minor et al. |
| 5,425,890 A | 6/1995 | Yudin et al. |
| 5,458,798 A | 10/1995 | Lunger et al. |
| 5,622,644 A | 4/1997 | Stevenson et al. |
| 5,624,596 A | 4/1997 | Lunger et al. |
| 5,626,790 A | 5/1997 | Minor |
| 5,672,293 A | 9/1997 | Minor et al. |
| 5,685,163 A | 11/1997 | Fujita et al. |
| 5,709,092 A | 1/1998 | Shiflett |
| 5,722,256 A | 3/1998 | Shiflett |
| 5,736,063 A | 4/1998 | Richard et al. |
| 5,785,883 A | 7/1998 | Minor et al. |
| 5,954,995 A | 9/1999 | Goble |
| 6,106,740 A | 8/2000 | Powell et al. |
| 6,117,356 A | 9/2000 | Powell et al. |
| 6,508,950 B1 | 1/2003 | Lim et al. |
| 6,526,764 B1 | 3/2003 | Singh et al. |
| 6,604,368 B1 | 8/2003 | Powell et al. |
| 6,606,868 B1 | 8/2003 | Powell et al. |
| 6,629,419 B1 | 10/2003 | Powell et al. |
| 6,783,691 B1 | 8/2004 | Bivens et al. |
| 6,991,743 B2 | 1/2006 | Poole et al. |
| 7,279,451 B2 | 10/2007 | Singh et al. |
| 7,569,170 B2 | 8/2009 | Minor |
| 7,629,306 B2 | 12/2009 | Shankland et al. |
| 7,972,528 B2 | 7/2011 | Poole et al. |
| 8,070,355 B2 | 12/2011 | Minor et al. |
| 8,465,664 B2 | 6/2013 | Poole et al. |
| 8,551,354 B2 | 10/2013 | Poole et al. |
| 8,628,681 B2 | 1/2014 | Low |
| 8,883,708 B2 | 11/2014 | Singh et al. |
| 8,889,031 B2 | 11/2014 | Sawada et al. |

(Continued)

FOREIGN PATENT DOCUMENTS

| | | |
|---|---|---|
| DE | 4116274 A1 | 11/1992 |
| EP | 0608164 A1 | 7/1994 |

(Continued)

OTHER PUBLICATIONS

International Search Report, PCT/EP2021/079297, 3 pages, dated Mar. 21, 2022. (Year: 2022).*
Written Opinion of the International Searching Authority, 9 pages, dated Mar. 21, 2022. (Year: 2022).*
Certified Priority Document, GB 1602586.08, filed Feb. 12, 2016 (Year: 2016).

(Continued)

*Primary Examiner* — Douglas J McGinty
(74) *Attorney, Agent, or Firm* — Weaver Austin Villeneuve & Sampson LLP

(57) ABSTRACT

A refrigerant consisting or consisting essentially of:
a) a nonflammable high volatility component consisting of carbon dioxide, and
b) a nonflammable low volatility component selected from the group consisting of: HFO1224yd(Z), HFO1224yd(E), HFO1233zd(E), HFO1233zd(Z), HFO1233xf, HFO1336mzz(E), HFO1336mzz(Z), 2-bromo-3,3,3-trifluoroprop-1-ene and mixtures thereof;
c) an intermediate volatility component selected from the group consisting of: HFO1234yf, HFO1234ze(E), HFO1225ye(Z), HFO1243zf and mixtures thereof; and
d) optionally a component selected from the group consisting of HFC227ea, HFC152a, HFC32 and mixtures thereof.

19 Claims, 5 Drawing Sheets

(56) References Cited

U.S. PATENT DOCUMENTS

Figure 1:
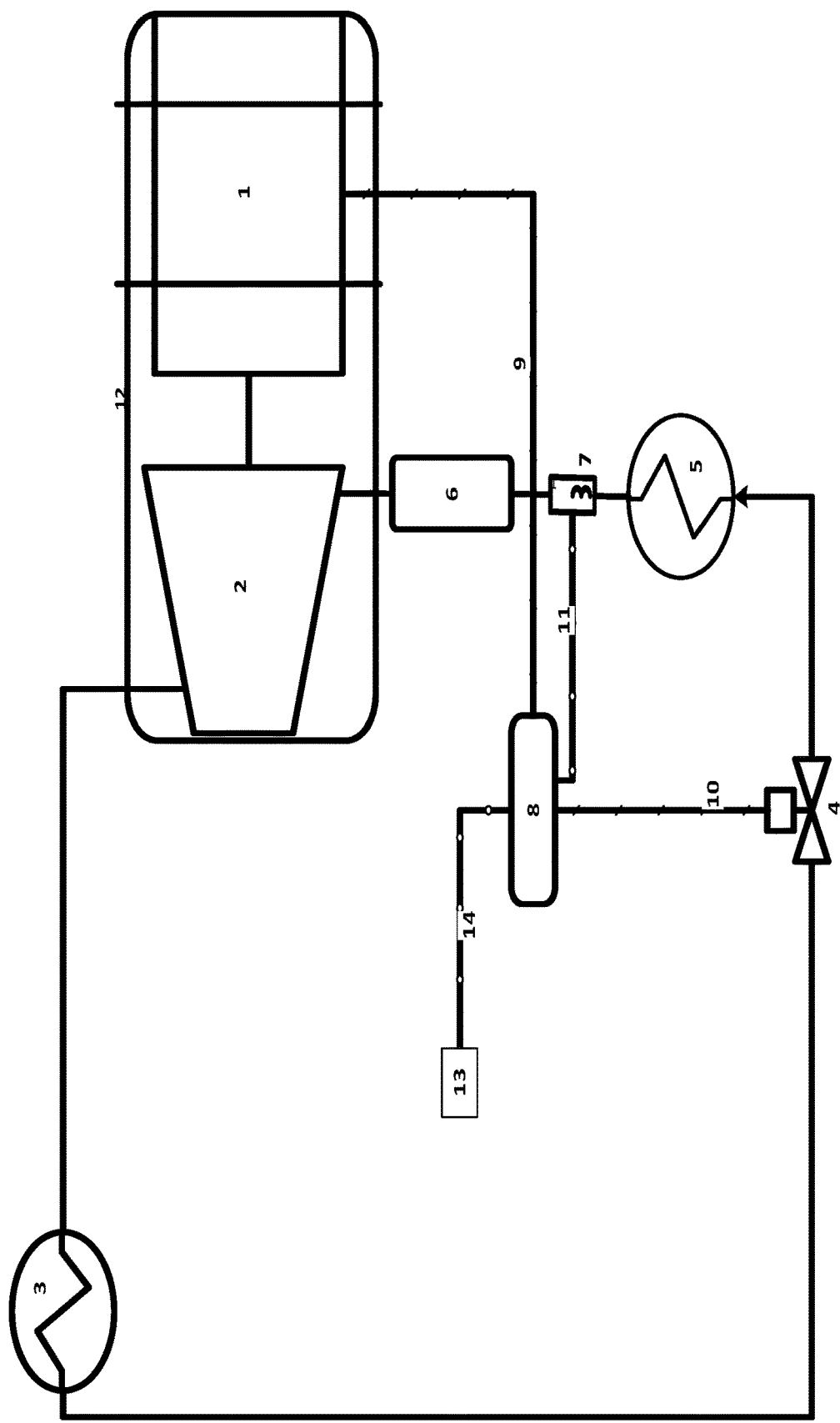

| | | |
|---|---|---|
| 8,974,688 B2 | 3/2015 | Yana et al. |
| 9,023,231 B2 | 5/2015 | Poole et al. |
| 9,062,237 B2 | 6/2015 | Poole et al. |
| 9,273,240 B2 | 3/2016 | Low et al. |
| 9,499,729 B2 | 11/2016 | Williams et al. |
| 9,624,414 B2 | 4/2017 | Poole et al. |
| 9,708,522 B2 | 7/2017 | Poole et al. |
| 9,764,999 B2 | 9/2017 | Singh et al. |
| 10,253,233 B2 | 4/2019 | Poole et al. |
| 11,459,497 B2 | 10/2022 | Poole et al. |
| 2003/0001132 A1 | 1/2003 | Lee et al. |
| 2003/0197149 A1 | 10/2003 | Lee et al. |
| 2004/0016902 A1 | 1/2004 | Lee et al. |
| 2007/0290163 A1 | 12/2007 | Poole et al. |
| 2008/0230738 A1 | 9/2008 | Minor et al. |
| 2009/0224199 A1 | 9/2009 | Poole et al. |
| 2009/0242828 A1 | 10/2009 | Poole et al. |
| 2011/0226983 A1 | 9/2011 | Poole et al. |
| 2012/0312048 A1 | 12/2012 | Poole et al. |
| 2013/0119299 A1 | 5/2013 | Low |
| 2013/0193369 A1 | 8/2013 | Low |
| 2014/0158930 A1 | 6/2014 | Poole et al. |
| 2014/0216075 A1 | 8/2014 | Singh et al. |
| 2014/0222699 A1 | 8/2014 | Low |
| 2014/0331697 A1 | 11/2014 | Minor et al. |
| 2015/0315446 A1 | 11/2015 | Yana Motta et al. |
| 2016/0024361 A1 | 1/2016 | Yana Motta et al. |
| 2016/0024362 A1 | 1/2016 | Zhili et al. |
| 2016/0068731 A1 | 3/2016 | Minor et al. |
| 2016/0251556 A1 | 9/2016 | Poole et al. |
| 2016/0272862 A1 | 9/2016 | Capuciati et al. |
| 2017/0081576 A1 | 3/2017 | Singh et al. |
| 2017/0152423 A1 | 6/2017 | Poole et al. |
| 2018/0066171 A1 | 3/2018 | Poole et al. |
| 2018/0264303 A1 | 9/2018 | Robin et al. |
| 2020/0230454 A1 | 7/2020 | Robin et al. |
| 2020/0317974 A1 | 10/2020 | Poole et al. |
| 2020/0362214 A1 | 11/2020 | Poole et al. |

FOREIGN PATENT DOCUMENTS

| | | | |
|---|---|---|---|
| EP | 0430169 B1 | 8/1994 | |
| EP | 0565265 B1 | 12/1995 | |
| EP | 0539952 B1 | 1/1996 | |
| EP | 0720639 B1 | 6/1997 | |
| EP | 0779352 A1 | 6/1997 | |
| EP | 0659862 B1 | 6/1998 | |
| EP | 1193305 A1 | 4/2002 | |
| EP | 0509673 B2 | 11/2003 | |
| GB | 2510322 A | 8/2014 | |
| JP | H0418484 A | 1/1992 | |
| JP | H07173462 A | 7/1995 | |
| JP | H08143696 A | 6/1996 | |
| JP | H08170074 A | 7/1996 | |
| JP | H09208940 A | 8/1997 | |
| JP | H11181414 A | 7/1999 | |
| JP | 3226247 U | 5/2020 | |
| WO | WO-9201762 A1 | 2/1992 | |
| WO | WO-9211339 A1 | 7/1992 | |
| WO | WO-9216597 A1 | 10/1992 | |
| WO | WO-9426835 A1 | 11/1994 | |
| WO | WO-9508602 A1 | 3/1995 | |
| WO | WO-9603472 A1 | 2/1996 | |
| WO | WO-9603473 A1 | 2/1996 | |
| WO | WO-9707179 A1 | 2/1997 | |
| WO | WO-9715637 A1 | 5/1997 | |
| WO | WO-9808912 A1 | 3/1998 | |
| WO | WO-9936485 A1 | 7/1999 | |
| WO | WO-2005083028 A1 | 9/2005 | |
| WO | WO-2008113984 A1 | 9/2008 | |
| WO | WO-2009089511 A2 | 7/2009 | |
| WO | WO-2011077088 A1 | 6/2011 | |
| WO | WO-2014076475 A2 | 5/2014 | |
| WO | WO-2016156812 A1 | 10/2016 | |
| WO | WO-2017151488 A1 | 9/2017 | |
| WO | WO-2019022138 A1 * | 1/2019 | ............... C09K 5/04 |
| WO | WO-2019022139 A1 * | 1/2019 | |

OTHER PUBLICATIONS

Combined Search Report and Examination Report under Section 17 and 18(3), dated Sep. 14, 2021, for UK Patent Application No. GB2103406.1.
Examination Report dated Apr. 15, 2013, for EP Patent Application No. 10807634.0.
International Preliminary Report on Patentability, dated Jun. 2, 2020, for International Patent Application No. PCT/EP2018/082597, 7 pages.
International Preliminary Report on Patentability, dated Jun. 2, 2020, for International Patent Application No. PCT/EP2018/082583, 7 pages.
International Search Report, dated Dec. 2, 2019, for International Patent Application No. PCT/EP2018/082583, 3 pages.
International Search Report, dated Jul. 15, 2016, for International Patent Application No. PCT/GB2016/050827.
International Search Report, dated May 23, 2017, for International Patent Application No. PCT/EP2018/082597, 11 pages.
International Search Report dated Jan. 16, 2015, for International Patent Application No. PCT/GB2014/053036.
Invitation to Pay Additional Fees, dated Jan. 25, 2022, in International Patent Application No. PCT/EP2021/079297.
Non-final Office Action, dated Apr. 27, 2021, for U.S. Appl. No. 16/764,347.
Non-final Office Action, dated Jul. 22, 2021, for U.S. Appl. No. 16/764,817.
Notification Concerning Transmittal of International Preliminary Report on Patentability, dated Jun. 11, 2020, for International Patent Application No. PCT/EP2018/082583, 1 page.
Notification Concerning Transmittal of International Preliminary Report on Patentability, dated Jun. 11, 2020, for International Patent Application No. PCT/EP2018/082597, 1 page.
Office Action dated Apr. 30, 2014, for Chinese Patent Application No. 201080064491.6, with English translation.
Patrial European Search Report, dated Mar. 24, 2021, in EP Application No. 20 20 3466.
U.S. Appl. No. 15/029,232, Corrected Notice of Allowability, dated Mar. 20, 2017.
U.S. Appl. No. 15/029,232, Non-Final Office Action, dated Sep. 13, 2016.
U.S. Appl. No. 15/029,232, Notice of Allowance, dated Jan. 5, 2017.
U.S. Appl. No. 15/431,427, Non-Final Office Action, dated Mar. 3, 2017.
U.S. Appl. No. 15/431,427, Notice of Allowance, dated Apr. 5, 2017.
U.S. Appl. No. 15/558,540, Notice of Allowance, dated Nov. 27, 2018.
U.S. Appl. No. 12/281,304, Notice of Allowance dated Aug. 21, 2013.
U.S. Appl. No. 12/281,304, Office Action dated Apr. 5, 2013.
U.S. Appl. No. 12/281,304, Office Action dated Jul. 6, 2011.
U.S. Appl. No. 12/281,304, Office Action dated Mar. 25, 2011.
U.S. Appl. No. 12/281,304, Office Action dated May 1, 2012.
U.S. Appl. No. 12/281,304, Office Action dated Nov. 16, 2011.
U.S. Appl. No. 12/281,304, Office Action dated Oct. 14, 2010.
U.S. Appl. No. 12/281,306, Notice of Allowance dated Apr. 1, 2011.
U.S. Appl. No. 12/281,306, Office Action dated Mar. 24, 2010.
U.S. Appl. No. 12/281,306, Office Action dated Oct. 18, 2010.
U.S. Appl. No. 13/118,304, Notice of Allowance dated May 6, 2013.
U.S. Appl. No. 13/118,304, Office Action dated Jun. 6, 2012.
U.S. Appl. No. 13/118,304, Office Action dated Nov. 29, 2011.
U.S. Appl. No. 13/118,304, Office Action dated Oct. 15, 2012.
U.S. Appl. No. 13/118,304, "Refrigerant Composition", Poole et al., filed May 27, 2011.
U.S. Appl. No. 13/515,798, Notice of Allowance dated Feb. 23, 2015.
U.S. Appl. No. 13/515,798, Office Action dated Feb. 5, 2015.

(56) References Cited

OTHER PUBLICATIONS

U.S. Appl. No. 13/893,179, Notice of Allowance dated Apr. 24, 2015.
U.S. Appl. No. 13/893,179, Office Action dated Dec. 12, 2014.
U.S. Appl. No. 13/893,179, Office Action dated Oct. 30, 2014.
Written Opinion of the Searching Authority, dated Dec. 2, 2019, for International Patent Application No. PCT/EP2018/082583, 6 pages.
Written Opinion of the Searching Authority, dated Jul. 15, 2016, for International Patent Application No. PCT/GB2016/050827.
Written Opinion of the Searching Authority, dated May 23, 2017, for International Patent Application No. PCT/EP2018/082597, 7 pages.
U.S. Advisory Action dated Mar. 22, 2022 in U.S. Appl. No. 16/764,347.
U.S. Notice of Allowance dated May 31, 2022 in U.S. Appl. No. 16/764,347.

* cited by examiner

THERMAL PUMP REFRIGERANTS

This disclosure relates to refrigerants for thermal pumps which may have wide intrinsic glide and very wide glide refrigerant compositions, particularly, but not exclusively compositions with GWPs less than 400, preferably less than 150 and more preferably less than 10. The refrigerants may be used for various applications including refrigeration, air-conditioning and heat pumping processes. These applications are collectively known as thermal pumping.

Embodiments of this disclosure operate the Reverse Rankine Cycle (RRC).

RRC equipment is well known to those skilled in the art. In its simplest form, it consists of an evaporator where a two-phase liquid/vapour refrigerant evaporates at a lower pressure and temperature absorbing heat from an adjacent heat sink. The vapour from the evaporator is sucked into a compressor where it is compressed to a higher pressure and higher temperature. The vapour then enters a condenser where, by rejecting to an adjacent heat sink, it condenses to a liquid. The higher pressure, higher temperature liquid passes through an expansion device which lowers its pressure to that of the evaporator and a portion of the liquid evaporates reducing its temperature. The 2-phase mixture of liquid and vapour enters the evaporator to continue the cycle.

Another name for the RRC is the 'Vapour Recompression Compression' cycle (VRC).

Zeotropic refrigerant compositions evaporate and condense over a temperature range at constant pressure. This range is called the 'temperature glide' or simply the 'glide'. But confusingly different definitions of the term 'glide' may be found in the prior art. For example, the term 'glide' may be defined as the temperature difference between the bubble point and the dew point at the specified constant pressure. Defined in this way, "glide" is a purely thermodynamic property of a refrigerant and is independent of equipment and operating conditions. In this specification the difference between the bubble point and the dew point at an absolute pressure of 1 atmosphere is termed the 'thermodynamic glide' of a blend.

Alternatively, the 'glide' in an evaporator may refer to the difference between entry temperature and the dew point, a value that is necessarily less than the thermodynamic glide and is dependent upon the operating conditions and the equipment design as well as the composition of the blend. In the condenser the glide is the difference between the dew point and the bubble point and is also dependent upon the operating conditions and the equipment design as well as the composition of the blend. In this specification the term "intrinsic temperature glide" refers to the temperature difference between the beginning and end of a two-phase heat transfer region in an evaporator or condenser, assuming that there is no pressure drop. If an evaporator or condenser is 'flooded', both liquid and vapour phases are simultaneously present along the whole length of the DX heat exchanger coil, then the glide is the temperature difference between the ends of the heat exchanger. The value will be less than the values given by the previous definitions.

In some thermal heat pumps the refrigerant glide may be exploited to improve their performance using a development of RRC/VRC called the Lorentz Cycle. In this specification reference to the RRC/VRC designation will also encompass the Lorentz Cycle.

In this specification thermodynamic temperature glides may be classified as follows:
1. Negligible glide—less than 0.5K
2. Small glide—0.5K to 2.0K
3. Medium glide—more than 2.0K to 5.0K
4. Wide glide—more than 5K to 10.0K
5. Very wide glide—more than 10.0K Compositions of the present disclosure may have wide or very wide thermodynamic temperature glides.

In a real heat exchanger there is necessarily a pressure drop to maintain the refrigerant flow. This causes a 'pressure induced temperature glide'. The intrinsic and pressure induced glides combine to give the actual glide. In the evaporator the intrinsic glide and the pressure induced glides act in opposite directions, therefore in an evaporative two-phase region, the actual temperature glide is less than the intrinsic temperature glide. But in a condensing two-phase flow region the intrinsic and pressure-induced glides act in the same direction. Therefore, they are additive so that the actual temperature glide is greater than the intrinsic temperature glide. For convenience in this specification the term "glide" will be taken to mean "intrinsic temperature glide", unless indicated otherwise. This meaning is in accordance with custom and practice of those skilled in the art where the contribution of pressure induced glide is often ignored. If the net glide resulting from the combination of the intrinsic and pressure induced glides is being considered, it will be called the 'actual glide'.

If a zeotrope is registered with the American Society of Heating and Refrigeration Engineers (ASHRAE) it is given an "R4XX" number. Although some blends are formally zeotropes, e.g. R404A and R410A, they have glides typically less than 1 K and are classed as "near-azeotropes". For practical purposes they can be treated as azeotropes.

It is a common belief that azeotrope-like compositions, with glides less than 5 K and preferably less than 1 K, are necessary for the efficient and reliable operation of thermal pumping systems. The present inventors have unexpectedly discovered that zeotropic compositions with thermodynamic glides greater than 5 K and even greater than 10 K can be used satisfactorily in specifically designed units.

Various refrigerants are commercially available for thermal pumping equipment. For chillers with condensing pressures less than 2 bara low volatility refrigerants such as R123 (bp 28° C.) may be employed. For chillers and medium temperature refrigeration R1234ze(E) may be used, while for mobile air conditioning R1234yf may be preferred. Some of these refrigerants have certain disadvantages. R123 has an ODP of 0.06 and a GWP of 77, so is being phased out. R1233zd(E) (bp 18.3° C. ODP 0; GWP 1) is a potential replacement for R123 but its condensing pressure may exceed 2 bara.

R404A and R507 are widely used for refrigeration, and R410A is widely used for air conditioning and heat pumping. They are excellent refrigerants in terms of energy efficiency, non-flammability, low toxicity and thermodynamic properties. However, they have Global Warming Potentials (GWP)s greater than 2000 and are therefore considered to be environmentally unacceptable. Regulations are being introduced globally to reduce their use and may ultimately lead to their phase-out. The European Union (EU) and other territories have imposed GWP quotas and/or taxes to progressively reduce the availability of R404A, R507 and R410A together with other HFC refrigerants. The F Gas Regulations in the EU substantially reduce the volumes of refrigerants based on their GWP that can be sold. The EU has also restricted the use of refrigerants with GWPs above 150 for some applications.

R32 is being introduced as an alternative to R410A, but still has an unacceptably high GWP of 675 and is flammable (ASHRAE rating A2L). R13B1 (bp −58° C.) is a very low temperature refrigerant with a very high ODP of 10, on a scale where the ODP of R11 is 1, and GWP of 6900. R22 is an excellent refrigerant, but is being phased out because of its ODP of 0.055.

The very low global warming potential R1234yf is thermodynamically a good match for high global warming R134a and has replaced the latter in mobile (vehicle) air conditioning systems. Nevertheless, R1234yf is flammable with an ASHRAE safety classification of A2L and its flammability resulted in industry resistance to its adoption with some vehicle manufacturers strongly advocating carbon dioxide, despite operating pressures of at least 100 bar, lower energy efficiency, susceptibility to reduced performance from even minor leaks and high compressor starting torque that might stall small internal combustion engines.

Ammonia, hydrocarbons and carbon dioxide are established fluids for refrigeration and air-conditioning systems and have considerably lower GWPs than hydrofluorocarbons (HFCs). However, they are also either toxic or flammable or both (in the case of ammonia). Apart from a significant safety hazard in a public place, such as a supermarket, flammable hydrocarbons can only be used safely in conjunction with a secondary refrigeration circuit. This reduces energy efficiency, increases costs and, with small charges, severely limits the maximum cooling duty of hydrocarbons. $CO_2$ must be used in the transcritical state on the high-pressure side of the system to allow heat rejection to ambient air. Pressures are often in excess of 100 bara resulting in an energy penalty and also a significantly higher capital cost compared to conventional R404A, R507 and R410A systems.

Although HFCs are minor contributors to global warming compared to $CO_2$ and methane, HFCs are controlled by the F Gas Regulation in the EU and the Kigali amendment to the Montreal Protocol in order to phase-down the use of HFCs and may ultimately result in their phase-out. The world has become accustomed to the global use of safe and practical HFCs, but increasingly restrictive HFC international regulations limiting their use are causing great uncertainty among Original Equipment Manufacturers (OEMs) regarding the selection of refrigerants which can be used in the long term. This uncertainty is inhibiting the development of improved thermal pumping technologies. An object of the disclosure is to address the problem of developing improved thermal pumping technologies.

Since its beginning in the middle of the $19^{th}$ Century, thermal pumping technology has been dominated by single component or azeotropic refrigerants, a trend that has continued to the present time. In the 1870s ammonia emerged as a major industrial refrigerant subsequently followed by carbon dioxide, sulfur dioxide, methyl chloride and hydrocarbons. The introduction of the much safer CFCs and the HCFCs in the 1930s, led to rapid growth of refrigeration and air conditioning with the introduction of the single component refrigerants CFC-12, CFC-114 and HCFC-22 and the azeotropes R500 and R502.

Equipment was designed specifically to optimise the performance of single component and azeotropic refrigerants, so that further new refrigerants were expected to conform to these engineering criteria. A fundamental characteristic is that these refrigerants evaporate and condense at constant temperature and at constant pressure. This is reinforced by the saturation tables, superheat tables and pressure-enthalpy charts provided by refrigerant suppliers and used throughout the industry, both by OEMs and by service technicians, to optimise the operation of existing installations. But these restrictive criteria, influenced by earlier refrigerant development, prevent the adoption of new refrigerants that combine low environmental impact with low hazard at point of use and acceptable thermal pumping performance. This specification discloses that refrigerants with thermodynamic temperature glides of more than 5K, so called "wide glide refrigerants" or 'very wide glide refrigerants' with even higher glides can overcome the problem of how to provide new refrigerants that combine low environmental impact with low hazard at point of use with acceptable thermal pumping performance.

In this specification the numerical value for a Global Warming Potential (GWP) refers to an Integrated Time Horizon (ITH) of 100 years as contained in the Inter-Governmental Panel on Climate Change Fourth Assessment Report.

According to this disclosure a refrigerant consists or consists essentially of:
a) a nonflammable high volatility component carbon dioxide, and
b) a nonflammable low volatility component selected from the group consisting of: HFO1224yd(Z), HFO1224yd(E), HFO1233zd(E), HFO1233zd(Z), HFO1233xf, HFO1336mzz(E), HFO1336mzz(Z), 2-bromo-3,3,3-trifluoroprop-1-ene; or mixtures thereof;
c) an intermediate volatility component selected from the group consisting of: HFO1234yf, HFO1234ze(E), HFO-1225ye(Z) and HFO1243zf or mixtures thereof; and
d) optionally a component selected from HFC-227ea, HFC-152a, HFC-32 or mixtures thereof.

Refrigerants of this disclosure may have global warming potentials up to 400.

In this specification percentages or other amounts are by mass unless indicated otherwise. Amounts are selected from any ranges given to total 100%. Pressures are quoted in bars absolute (bara).

The term 'hydrofluoro-olefin', may be shortened to 'HFO', and subsumes compounds containing hydrogen, fluorine and carbon atoms and optionally chlorine and bromine atoms.

The term "consisting of" is used in this specification to refer to compositions which include only the recited ingredients, disregarding trace amounts of any impurities.

The term "consisting essentially of" is used in this specification to refer to compositions which consist of the recited ingredients with the possible addition of minor amounts of any further ingredients which do not substantially alter the essential refrigerant properties of the composition. These compositions include compositions which consist of the recited ingredients. Compositions which consist of the recited ingredients may be particularly advantageous.

This disclosure relates to very low GWP blends, which particularly, but not exclusively, are compositions that may be used in new refrigeration, air-conditioning and heat pumping systems.

The blends have zero Ozone Depletion Potentials, so have no adverse effect on stratospheric ozone. The blends additionally or alternatively have GWPs of 400 or below, preferably 150 or below and more preferably below 10.

A method for ranking the relative flammabilities of refrigerants is provided by the ASHRAE 34 Committee scale which simply classifies refrigerants into four flammability classes, Class 1 No flame propagation
Class 2L Lower flammability
Class 2 Flammable
Class 3 Higher flammability The blends may have an ASHRAE safety classification of A1 (non-flammable) or alternatively A2L (lower flammability) which, combined with their low GWPs, less than 400, preferably less than 150 and most preferably less than 10, and high efficiencies, provide a novel combination of properties. The present disclosure especially relates to refrigerant compositions containing one or more hydrofluoro-olefins (HFOs).

The ASHRAE scale does not further distinguish between degrees of flammability within each class. But this can be done by considering the lower flammability limit (LFL) of a blend. The LFL of a refrigerant vapour in air at atmospheric pressure and temperature is the lower end of the concentration range over which the vapour can be ignited. If the vapour cannot be ignited, then it has no LFL at temperatures up to 60° C. and its ASHRAE rating is Class 1.

The refrigerants of the present disclosure may be referred to as wide glide or very wide glide refrigerants.

In an embodiment, the high volatility component has a vapour pressure of 1 atm at a temperature which is at least 10° C. lower than the intermediate volatility component and the intermediate volatility component has a vapour pressure of 1 atm at a temperature which is at least 10° C. lower than the low volatility component.

In embodiments, the high volatility component may have a vapour pressure of 1 atm at a temperature in the range of −80° C. to −45° C.

In an embodiment, the intermediate volatility component may have a vapour pressure of 1 atm at a temperature in the range of −35° C. to −15° C.

In an embodiment, the low volatility component may have a vapour pressure of 1 atm at a temperature in the range of 0° C. to 40° C.

In embodiments, the highest and lowest volatility components are nonflammable and the intermediate volatility component may be flammable.

The presence of the nonflammable components suppresses the flammabilities of the flammable component or components so the blend is nonflammable, which has the effect of raising the lower flammability limits (LFL) of the blend. Flammable compositions with ASHRAE safety classification A2L have higher GWPs due to the presence of HFC component(s) which provide additional beneficial properties for specific applications e.g. replacing HFC with lower global warming blends and similar technical properties.

At the beginning of a vapour leak or a liquid leak, for example under the conditions specified by the ASHRAE 34 standard flammability test standard, the high volatility, nonflammable $CO_2$ suppresses the flammability of R32, if present and of the flammable HFO components, and R152a if present. As the leak proceeds the concentrations of $CO_2$ and R32, if present, decrease, while the concentrations of flammable HFOs, and R152a if present, and nonflammable HFOs increase.

The presence of nonflammable $CO_2$ at the early stage of the leak and nonflammable HFOs at the later stage of the leak will suppress the flammabilities of the higher volatility HFOs, and HFC32 and HFC152a if present. Vapours and liquids with higher concentrations of the nonflammable components will have higher LFLs, and are therefore less flammable, although still ASHRAE Class 2L. Preferably the ratio of the nonflammable to flammable components throughout the leak is such that both the vapour compositions and liquid compositions at all times are nonflammable, i.e. compositions all comply with ASHRAE safety classification A1 Class 1.

In particular, this disclosure relates to blends of a high volatility, nonflammable component, $CO_2$, and a low volatility (boiling point >0° C.), very low GWP (<10), nonflammable HFO component and an intermediate volatility component (boiling point ca −19° C.), which provide a common basis for a range of low hazard, environmentally benign blends that can replace presently-used commercial refrigerants for a wide range of thermal pumping applications, including but not limited to refrigeration, vehicle and room air conditioning, heat pumping and low pressure (<2 bara) chillers. The carbon dioxide/low volatility HFO blends contains, intermediate volatility components (boiling points >−53° C. and <−10° C.) to provide blends with the required properties for specific thermal heat pumping applications.

We have found that these refrigerant compositions may be used for thermal pumping applications where fluids with unacceptably high GWPs or ODPs or flammability are presently employed, including, but not limited to, R13B1, R32, R410A, R404A, R507, R290 (propane), R22, R1234yf, R600 (butane), R600a (isobutane), HFO1224yd(Z), HFO1224zd(E), HFO1233zd(E), HFO1234ze(E), HFO1336mzz(Z) and HFO1336mzz(E), notwithstanding that some of these fluids may be components in the refrigerant compositions, In an embodiment the refrigerant may consist or consist essentially of the following components:

a high volatility component, an intermediate volatility component and a low volatility component; wherein the high volatility component has a vapour pressure at least 1 atmosphere higher than the intermediate volatility component; and the low volatility component has a vapour pressure at least 1 atm lower than the intermediate volatility component.

In an embodiment a refrigerant composition consists or consists essentially of: a nonflammable, high volatility component consisting of carbon dioxide;
a nonflammable low volatility component selected from the group consisting of: HFO1224yd(Z), HFO1224yd(E), HFO1233zd(E), HFO1233zd(Z), HFO1233xf, HFO1336mzz(E), HFO1336mzz(Z), 2-bromo-3,3,3-trifluoroprop-1-ene and mixtures thereof;
  an intermediate volatility component selected from the group consisting of: HFO1234yf, HFO1234ze(E), HFO1225ye(Z), HFO1243zf and mixtures thereof;
  optionally one or more components selected from the group consisting of: HFC227ea, HFC32, and HFC152a.

In an embodiment, a refrigerant consists or consists essentially of:
a) a nonflammable, high volatility component consisting of carbon dioxide;
b) a nonflammable low volatility component selected from the group consisting of: HFO1224yd(Z), HFO1224yd(E), HFO1233zd(E), HFO1233zd(Z), HFO1233xf, HFO1336mzz(E), HFO1336mzz(Z), 2-bromo-3,3,3-trifluoroprop-1-ene and mixtures thereof;

c) an intermediate volatility component selected from the group consisting of: HFO1234yf, HFO1234ze(E), HFO-1225ye(Z), HFO1243zf and mixtures thereof; and
d) optionally an HFC selected from the group consisting of HFC227ea, HFC152a HFC and mixtures thereof;
wherein the amount of the high volatility component is in the range from 5 wt % to 85 wt %;
wherein the amount of the low volatility component is in the range from 5 wt % to 95 wt %;
wherein the amount of the intermediate volatility component is in the range from 10 wt % to 90 wt %;
wherein the amount of HFC32 when present is in the range from 2 wt % to 59 wt %;
wherein the amount of HFC227ea when present is in the range from 1 wt % to 12.4 wt %;
wherein the amount of HFC152a when present is in the range from 2 wt % to 10 wt %.
wherein the amounts of the ingredients are selected from the ranges recited to total 100 wt %.

The sum of the percent weighted GWP contributions of the components may not exceed 400.

In an embodiment a refrigerant consists or consists essentially of:
a) a nonflammable high volatility component consisting of carbon dioxide,
b) a nonflammable low volatility component selected from the group consisting of: HFO1224yd(Z), HFO1224yd(E), HFO1233zd(E), HFO1233zd(Z), HFO1233xf, HFO1336mzz(E), HFO1336mzz(Z), 2-bromo-3,3,3-trifluoroprop-1-ene and mixtures thereof;
c) an intermediate volatility component selected from the group consisting of: HFO1234yf, HFO1234ze(E), HFO-1225ye(Z) and HFO1243zf or mixtures thereof; and
d) optionally and an HFC selected from the group consisting of HFC32, HFC227ea, HFC152a and mixtures thereof;
wherein the amount of the high volatility component is in the range from 5 wt % to 60 wt %;
wherein the amount of the low volatility component is in the range from 5 wt % to 40 wt %;
wherein the amount of the intermediate volatility component is in the range from 10 wt % to 65 wt %;
wherein the amount of HFC32 when present is in the range from 2 wt % to 59 wt %;
wherein the amount of HFC227ea when present is in the range from 1 wt % to 12.4 wt %;
wherein the amount of HFC152a when present is in the range from 2 wt % to 5 wt %;
wherein the amounts of the ingredients are selected from the ranges recited to total 100 wt %.

The sum of the percent weighted GWP contributions of the components may not exceed 400.

In an embodiment a refrigerant consists or consists essentially of:
a) a nonflammable, high volatility component consisting of $CO_2$;
b) a nonflammable low volatility component selected from the group consisting of: HFO1224yd(Z), HFO1224yd(E), HFO1233zd(E), HFO1233zd(Z), HFO1233xf, HFO1336mzz(E), HFO1336mzz(Z), 2-bromo-3,3,3-trifluoroprop-1-ene and mixtures thereof;
c) an intermediate volatility component selected from the group consisting of: HFO1234yf, HFO1234ze(E), HFO-1225ye(Z) and HFO1243zf and mixtures thereof; and
d) optionally an HFC selected from HFC32, HFC152a and HFC227ea and mixtures thereof;
wherein the amount of the high volatility component is in the range from 5 wt % to 30 wt %;
wherein the amount of the low volatility component is in the range from 75 wt % to 40 wt %;
wherein the amount of the intermediate volatility component is in the range from 10 wt % to 65 wt %;
wherein the amount of HFC32 when present is in the range from 22.2 wt % to 59 wt %;
wherein the amount of HFC227ea when present is in the range from 4.7 wt % to 12.4 wt %;
wherein the amount of HFC152a when present is in the range from 2 wt % to 10 wt %;
and
wherein the amounts of the ingredients are selected from the ranges recited to total 100 wt %.

The sum of the percent weighted GWP contributions of the components may be greater than 150 but does not exceed 400.

In an embodiment a refrigerant consists or consists essentially of:
a) a nonflammable, high volatility component consisting of $CO_2$;
b) a nonflammable low volatility component selected from the group consisting of: HFO1224yd(Z), HFO1224yd(E), HFO1233zd(E), HFO1233zd(Z), HFO1233xf, HFO1336mzz(E), HFO1336mzz(Z), 2-bromo-3,3,3-trifluoroprop-1-ene and mixtures thereof;
c) an intermediate volatility component selected from the group consisting of: HFO1234yf, HFO1234ze(E), HFO-1225ye(Z), HFO1243zf and mixtures thereof; and
d) optionally and an HFC selected from HFC32, HFC152a and HFC227ea and mixtures thereof;
wherein the amount of the high volatility component is in the range from 5 wt % to 30 wt %;
wherein the amount of the low volatility component is in the range from 5 wti % to 40 wt %;
wherein the amount of the intermediate volatility component is in the range from 10 wt % to 65 wt %;
wherein the amount of HFC32 when present is in the range from 2 wt % to 22 wt %;
wherein the amount of HFC227ea when present is in the range from 1 wt % to 4.7 wt %;
wherein the amount of HFC152a when present is in the range from 2 wt % to 5 wt %;
and
wherein the amounts of the ingredients are selected from the ranges recited to total 100 wt %.

The sum of the percent weighted GWP contributions of the components may be greater than 14 but does not exceed 150.

In an embodiment of this disclosure a refrigerant consists or consists essentially of:
a) a nonflammable, high volatility component consisting of $CO_2$;
b) a nonflammable low volatility component selected from the group consisting of: HFO1224yd(Z), HFO1224yd(E), HFO1233zd(E), HFO1233zd(Z), HFO1233xf, HFO1336mzz(E), HFO1336mzz(Z), 2-bromo-3,3,3-trifluoroprop-1-ene and mixtures thereof;
c) an intermediate volatility component selected from the group consisting of: HFO1234yf, HFO1234ze(E), HFO-1225ye(Z), HFO1243zf and mixtures thereof; and
d) HFC32;
wherein the amount of the high volatility component is in the range from 5 wt % to 30 wt %;
wherein the amount of the low volatility component is in the range from 5 wt % to 40 wt %;
wherein the amount of the intermediate volatility component is in the range from 10 wt % to 60 wt %;
wherein the amount of HFC32 is in the range from 2 wt % to 22 wt %;
wherein the amounts of the ingredients are selected from the ranges recited to total 100 wt %.

The sum of the percent weighted GWP contributions of the components may be greater than 14 but does not exceed 150.

In an embodiment of this disclosure a refrigerant consists or consists essentially of:
a) a nonflammable, high volatility component consisting of $CO_2$;
b) a nonflammable low volatility component selected from the group consisting of: HFO1224yd(Z), HFO1224yd(E), HFO1233zd(E), HFO1233zd(Z), HFO1233xf, HFO1336mzz(E), HFO1336mzz(Z), 2-bromo-3,3,3-trifluoroprop-1-ene and mixtures thereof;
c) an intermediate volatility component selected from the group consisting of: HFO1234yf, HFO1234ze(E), HFO-1225ye(Z), HFO1243zf and mixtures thereof; and
d) HFC32;
wherein the amount of the high volatility component is in the range from 6 wt % to 25 wt %;
wherein the amount of the low volatility component is in the range from 7 wt % to 30 wt %;
wherein the amount of the intermediate volatility component is in the range from 40 wt % to 60 wt %;
wherein the amount of HFC32 is in the range from 10 wt % to 21.5 wt %;
wherein the amounts of the ingredients are selected from the ranges recited to total 100 wt %.

The sum of the percent weighted GWP contributions of the components may be greater than 14 but does not exceed 150.

In an embodiment of this disclosure a refrigerant consists or consists essentially of:
a) a nonflammable, high volatility component consisting of $CO_2$;
b) a nonflammable low volatility component selected from the group consisting of: HFO1224yd(Z), HFO1224yd(E), HFO1233zd(E), HFO1233zd(Z), HFO1233xf, HFO1336mzz(E), HFO1336mzz(Z), 2-bromo-3,3,3-trifluoroprop-1-ene and mixtures thereof;
c) an intermediate volatility component selected from the group consisting of: HFO1234yf, HFO1234ze(E), HFO-1225ye(Z), HFO1243zf and mixtures thereof; and
d) HFC32:
wherein the amount of the high volatility component is in the range from 5 wt % to 15 wt %;
wherein the amount of the low volatility component is in the range from 6 wt % to 35 wt %;
wherein the amount of the intermediate volatility component is in the range from 46 wt % to 55 wt %;
wherein the amount of HFC32 is in the range from 15 wt % to 21.5 wt %;
wherein the amounts of the ingredients are selected from the ranges recited to total 100 wt %.

The sum of the percent weighted GWP contributions of the components may be greater than 14 but does not exceed 150.

In an embodiment a refrigerant consists or consists essentially of:
a) a nonflammable, high volatility component consisting of $CO_2$;
b) a nonflammable low volatility component selected from the group consisting of: HFO1224yd(Z), HFO1224yd(E), HFO1233zd(E), HFO1233zd(Z), HFO1233xf, HFO1336mzz(E), HFO1336mzz(Z), 2-bromo-3,3,3-trifluoroprop-1-ene and mixtures thereof;
c) an intermediate volatility component selected from the group consisting of: HFO1234yf, HFO1234ze(E), HFO-1225ye(Z), HFO1243zf and mixtures thereof; and
d) HFC227ea;
wherein the amount of the high volatility component is in the range from 5 wt % to 30 wt %;
wherein the amount of the low volatility component is in the range from 5 wt % to 40 wt %;
wherein the amount of the intermediate volatility component is in the range from 10 wt % to 65 wt %;
wherein the amount of HFC227ea is in the range from 2 wt % to 4.7 wt %;
wherein the amounts of the ingredients are selected from the ranges recited to total 100 wt %.

The sum of the percent weighted GWP contributions of the components may be greater than 64 but does not exceed 150.

In an embodiment of this disclosure a refrigerant consists or consists essentially of:
a) a nonflammable high volatility component consisting of carbon dioxide,
b) a nonflammable low volatility component selected from the group consisting of: HFO1224yd(Z), HFO1224yd(E), HFO1233zd(E), HFO1233zd(Z), HFO1233xf, HFO1336mzz(E), HFO1336mzz(Z), 2-bromo-3,3,3-trifluoroprop-1-ene and mixtures thereof;
c) an intermediate volatility component selected from the group consisting of: HFO1234yf, HFO1234ze(E), HFO-1225ye(Z), HFO1243zf and mixtures thereof; and
wherein the amount of the high volatility component is in the range from 5 wt to 60 wt %;
wherein the amount of the low volatility component is in the range from 5 wt % to 40 wt %;
wherein the amount of the intermediate volatility component is in the range from 10 wt % to 75 wt %; and
wherein the amounts of the ingredients are selected from the ranges recited to total 100 wt %.

The sum of the percent weighted GWP contributions of the components may not exceed 10.

In an embodiment of this disclosure a refrigerant consists or consists essentially of:
a) a nonflammable high volatility component consisting of carbon dioxide, b) a nonflammable low volatility component selected from the group consisting of: HFO1224yd(Z), HFO1224yd(E), HFO1233zd(E), HFO1233zd(Z), HFO1233xf, HFO1336mzz(E), HFO1336mzz(Z), 2-bromo-3,3,3-trifluoroprop-1-ene and mixtures thereof;
c) an intermediate volatility component selected from the group consisting of: HFO1234yf, HFO1234ze(E), HFO-1225ye(Z), HFO1243zf and mixtures thereof; and wherein the amount of the high volatility component is in the range from 10 wt % to 50 wt %;

wherein the amount of the low volatility component is in the range from 5 wt % to 35 wt %;

wherein the amount of the intermediate volatility component is in the range from 12 wt % to 70 wt %; and wherein the amounts of the ingredients are selected from the ranges recited to total 100 wt %.

The sum of the percent weighted GWP contributions of the components may not exceed 10.

In an embodiment of this disclosure a refrigerant consists or consists essentially of:
a) a nonflammable, high volatility component consisting of $CO_2$;
b) a nonflammable low volatility component selected from the group consisting of: HFO1224yd(Z), HFO1224yd(E), HFO1233zd(E), HFO1233zd(Z), HFO1233xf, HFO1336mzz(E), HFO1336mzz(Z), 2-bromo-3,3,3-trifluoroprop-1-ene and mixtures thereof;
c) an intermediate volatility component selected from the group consisting of: HFO1234yf, HFO1234ze(E), HFO-1225ye(Z), HFO1243zf and mixtures thereof; and wherein the amount of the high volatility component is in the range from 10 wt % to 40 wt %;

wherein the amount of the intermediate volatility component is in the range from 15 wt % to 55 wt %;

wherein the amount of the low volatility component is in the range from 7 wt % to 25 wt %; and wherein the amounts of the ingredients are selected from the ranges recited to total 100 wt %.

The sum of the percent weighted GWP contributions of the components may not exceed 10.

In an embodiment of this disclosure a refrigerant consists or consists essentially of:
a) a nonflammable, high volatility component consisting of $CO_2$;
b) a nonflammable low volatility component selected from the group consisting of: HFO1224yd(Z), HFO1224yd(E), HFO1233zd(E), HFO1233zd(Z), HFO1233xf, HFO1336mzz(E), HFO1336mzz(Z), 2-bromo-3,3,3-trifluoroprop-1-ene and mixtures thereof;
c) an intermediate volatility component selected from the group consisting of: HFO1234yf, HFO1234ze(E), HFO-1225ye(Z), HFO1243zf and mixtures thereof; and wherein the amount of the high volatility component is in the range from 20 wt % to 40 wt %;

wherein the amount of the intermediate volatility component is in the range from 30 wt % to 55 wt %;

wherein the amount of the low volatility component is in the range from 7 wt % to 25 wt %; and wherein the amounts of the ingredients are selected from the ranges recited to total 100 wt %.

The sum of the percent weighted GWP contributions of the components may not exceed 10.

An embodiment of this disclosure provides a refrigerant with a GWP less than 400 suitable for a system including components which are pressure-rated for use with R32 and R410A that might be employed in new split a/c unit or retrofitted into existing split a/c unit.

In an embodiment of this disclosure a refrigerant, suitable for retrofitting for pure R32 in an existing split thermal pump unit, consists or consists essentially of:
a) a nonflammable, high volatility component consisting of $CO_2$;
b) a nonflammable low volatility component selected from the group consisting of: HFO1224yd(Z), HFO1224yd(E), HFO1233zd(E), HFO1233zd(Z), HFO1233xf, HFO1336mzz(E), HFO1336mzz(Z), 2-bromo-3,3,3-trifluoroprop-1-ene and mixtures thereof;
c) an intermediate volatility component selected from the group consisting of: HFO1234yf, HFO1234ze(E), HFO-1225ye(Z), HFO1243zf and mixtures thereof; and
d) HFC32;

wherein the amount of the high volatility component is in the range from 8 wt % to 19 wt %;

wherein the amount of the low volatility component is in the range from 5 wt % to 8 wt %;

wherein the amount of the intermediate volatility component is in the range from 39 wt % to 51 wt %;

wherein the amount of HFC32 is in the range from 35 wt % to 44 wt %;

wherein the amounts of the ingredients are selected from the ranges recited to total 100 wt %.

wherein the bubble point vapour pressure of the blend at 40° C. does not exceed 30 bara.

The sum of the percent weighted GWP contributions of the components may be greater than 14 but does not exceed 300.

An embodiment of this disclosure provides a refrigerant with a GWP less than 150 suitable for use in refrigeration applications presently served by R404A. A preferred blend has a bubble point pressure not greater than 30 bara at 35° C. An even more preferred blend has a bubble point pressure not greater than 20 bara at 35° C.

In an embodiment of this disclosure a refrigerant, suitable for refrigeration applications where R404A is presently used, consists or consists essentially of:
a) a nonflammable, high volatility component consisting of $CO_2$;
b) a nonflammable low volatility component selected from the group consisting of: HFO1224yd(Z), HFO1224yd(E), HFO1233zd(E), HFO1233zd(Z), HFO1233xf, HFO1336mzz(E), HFO1336mzz(Z), 2-bromo-3,3,3-trifluoroprop-1-ene and mixtures thereof;
c) an intermediate volatility component selected from the group consisting of: HFO1234yf, HFO1234ze(E), HFO-1225ye(Z), HFO1243zf and mixtures thereof; and
d) HFC32, HFC227ea or mixtures thereof.

wherein the amount of the high volatility component is in the range from 10 wt % to 35 wt %;

wherein the amount of the low volatility component is in the range from 5 wt % to 20 wt %;

wherein the amount of the intermediate volatility component is in the range from 40 wt % to 80 wt %;

wherein the amount of HFC32 when present is in the range from 18 wt % to 22 wt %;

wherein the amount of HFC227ea when present is in the range from 2 wt % to 4.5 wt %;

wherein the amounts of the ingredients are selected from the ranges recited to total 100 wt %.

wherein the bubble point vapour pressure of the blend at 35° C. does not exceed 30 bara.

The sum of the percent weighted GWP contributions of the components may not exceed 150.

An embodiment of this disclosure provides a refrigerant with a GWP less than 150 suitable for use in refrigeration applications presently served by R410A and HFC32. A preferred blend has a bubble point pressure not greater than 35 bara at 35° C. An even more preferred blend has a bubble point pressure not greater than 25 bara at 35° C.

In an embodiment of this disclosure a refrigerant, suitable for refrigeration applications where HFC32 and R410A are presently used, consists or consists essentially of:
a) a nonflammable, high volatility component consisting of $CO_2$;
b) a nonflammable low volatility component selected from the group consisting of: HFO1224yd(Z), HFO1224yd(E), HFO1233zd(E), HFO1233zd(Z), HFO1233xf, HFO1336mzz(E), HFO1336mzz(Z), 2-bromo-3,3,3-trifluoroprop-1-ene and mixtures thereof;
c) an intermediate volatility component selected from the group consisting of: HFO1234yf, HFO1234ze(E), HFO1225ye(Z), HFO1243zf and mixtures thereof; and
d) HFC32, HFC227ea or mixtures thereof.

wherein the amount of the high volatility component is in the range from 8 wt % to 25 wt %;

wherein the amount of the low volatility component is in the range from 5 wt % to 20 wt %;

wherein the amount of the intermediate volatility component is in the range from 35 wt % to 70 wt %;

wherein the amount of HFC32 when present is in the range from 18 wt % to 22 wt %;

wherein the amount of HFC227ea when present is in the range from 2 wt % to 5 wt %;

wherein the amounts of the ingredients are selected from the ranges recited to total 100 wt %; and wherein the bubble point vapour pressure of the blend at 35° C. does not exceed 35 bara.

The sum of the percent weighted GWP contributions of the components may not exceed 150.

An embodiment of this disclosure provides a refrigerant with a GWP less than 10 suitable for use in refrigeration applications presently served by R404A. A preferred blend has a bubble point pressure not greater than 30 bara at 35° C. An even more preferred blends has a bubble point pressure not greater than 20 bara at 35° C.

In an embodiment of this disclosure a refrigerant, suitable for refrigeration applications where R404A is presently used, consists or consists essentially of:
a) a nonflammable, high volatility component consisting of $CO_2$;
b) a nonflammable low volatility component selected from the group consisting of: HFO1224yd(Z), HFO1224yd(E), HFO1233zd(E), HFO1233zd(Z), HFO1233xf, HFO1336mzz(E), HFO1336mzz(Z), 2-bromo-3,3,3-trifluoroprop-1-ene and mixtures thereof;
c) an intermediate volatility component selected from the group consisting of: HFO1234yf, HFO1234ze(E), HFO-1225ye(Z), HFO1243zf and mixtures thereof; and wherein the amount of the high volatility component is in the range from 9 wt % to 35 wt %;

wherein the amount of the low volatility component is in the range from 5 wt % to 12 wt %;

wherein the amount of the intermediate volatility component is in the range from 39 wt % to 62 wt %;

wherein the amounts of the ingredients are selected from the ranges recited to total 100 wt %.

wherein the bubble point vapour pressure of the blend at 35° C. does not exceed 30 bara.

The sum of the percent weighted GWP contributions of the components may be greater does not exceed 10.

In an embodiment of this disclosure provides a refrigerant with a GWP less than 10 suitable for use in refrigeration applications presently served by R410A and R32. A preferred blend has a bubble point pressure not greater than 45 bara at 35° C. An even more preferred blends has a bubble point pressure not greater than 35 bara at 35° C.

In an embodiment of this disclosure provides a refrigerant, suitable for thermal pumping applications where R410A or R32 are presently used, consists or consists essentially of:
a) a nonflammable, high volatility component consisting of $CO_2$;
b) a nonflammable low volatility component selected from the group consisting of: HFO1224yd(Z), HFO1224yd(E), HFO1233zd(E), HFO1233zd(Z), HFO1233xf, HFO1336mzz(E), HFO1336mzz(Z), 2-bromo-3,3,3-trifluoroprop-1-ene and mixtures thereof;
c) an intermediate volatility component selected from the group consisting of: HFO1234yf, HFO1234ze(E), HFO-1225ye(Z), HFO1243zf and mixtures thereof; and
d) wherein the amount of the high volatility component is in the range from 9 wt % to 30 wt %;

wherein the amount of the low volatility component is in the range from 5 wt % to 25 wt %;

wherein the amount of the intermediate volatility component is in the range from 39 wt % to 62 wt %;

wherein the amounts of the ingredients are selected from the ranges recited to total 100 wt %.

wherein the bubble point vapour pressure of the blend at 35° C. does not exceed 40 bara.

The sum of the percent weighted GWP contributions of the components may be greater does not exceed 10.

For thermal pumping applications where equipment footprint is an important factor, for example marine refrigeration or air conditioning, high capacity refrigerants may be preferred but they may require high pressure components rated to say 100 bar. Although pure $CO_2$ operating on a transcritical cycle may provide higher capacity, it may be less energy efficient than a blend provided by this disclosure operating on the Reverse Rankine Cycle.

An embodiment of this disclosure provides a refrigerant with a GWP less than 10 suitable for use in high capacity thermal pumping applications presently served by R404A, R410A and R32.

In an embodiment of this disclosure a refrigerant, suitable for refrigeration applications where R404A, R410A or R32 are presently used, consists or consists essentially of:
a) a nonflammable, high volatility component consisting of $CO_2$;

b) a nonflammable low volatility component selected from the group consisting of: HFO1224yd(Z), HFO1224yd(E), HFO1233zd(E), HFO1233zd(Z), HFO1233xf, HFO1336mzz(E), HFO1336mzz(Z), 2-bromo-3,3,3-trifluoroprop-1-ene and mixtures thereof;

c) an intermediate volatility component selected from the group consisting of: HFO1234yf, HFO1234ze(E), HFO-1225ye(Z), HFO1243zf and mixtures thereof; and d) wherein the amount of the high volatility component is in the range from 70 wt % to 85 wt %;

wherein the amount of the low volatility component is in the range from 5 wt % to 25 wt %;

wherein the amount of the intermediate volatility component is in the range from 5 wt % to 25 wt %;

wherein the amounts of the ingredients are selected from the ranges recited to total 100%.

The sum of the percent weighted GWP contributions of the components may be greater does not exceed 10.

The hydrofluoroolefins (HFOs) employed in this disclosure include:

HFO1234yf (2,3,3,3-tetrafluoroprop-1-ene);
HFO1234ze(E) (E-1,3,3,3-tetrafluoroprop-1-ene);
HFO1216 (hexafluoropropene);
HFO1243zf (3,3,3-trifluoroprop-1-ene);
HFO1225ye(Z) (Z-1,2,3,3,3-pentafluoroprop-1-ene);
HFO1224yd(Z) (Z-1-chloro-2,3,3,3-tetrafluoropropene);
HFO1233zd(E) (E-1-chloro-3,3,3-trifluoro-prop-1-ene);
HFO1233zd(Z) (Z-1-chloro-3,3,3-trifluoro-prop-1-ene);
HFO1233xf (2-chloro-3,3,3-trifluoro-prop-1-ene);
2-bromo-3,3,3-trifluoro-prop-1-ene;
HFO1336mzz(Z) (Z-1,1,1,4,4,4-hexafluoro-but-1-ene;
HFO1336mzz(E) (E-1,1,1,4,4,4-hexafluoro-but-1-ene;
HFO1234ze(Z);

HFO1234ze(Z) with a boiling point of 9.8° C. may be considered as low volatility HFO but it does not meet the requirement in this specification that the low volatility HFOs be nonflammable. Nevertheless, nonflammable mixtures of HFO1234ze(Z) with other nonflammable low volatility HFOs may be used in compositions of this disclosure.

HFO1224may be a preferred hydrofluorocarbon.

The GWP value of the listed low volatility HFOs are very low, for example in the range 1 to 18.

|  | AR4 GWP |
|---|---|
| HFC125 | 3500 |
| HFO1224yd(Z) | 4 |
| HFC134a | 1430 |
| carbon dioxide | 1 |
| HFO1234yf | 1 |
| HFC227ea | 3220 |
| HFO1234ze(E) | 7 |
| HFC32 | 675 |
| HFO1336mzz(Z) | 9 |
| HFO1234ze(Z) | 1 |
| HFO1336mzz(E) | 18 |
| HFO1233zd(E) | 5 |
| HFC152a | 124 |

The equipment described in this specification incorporates condensers and evaporators. These may be 'DX' types where refrigerant flows through one end of a 'coil' to the other. A 'coil' is the term commonly used for a length of tubing used in a heat exchanger.

In an embodiment thermal pump apparatus comprises a circuit including:

an evaporator, a compressor, a condenser, an expansion device and a circulating refrigerant fluid as claimed in this disclosure;

the thermal pump apparatus further comprising a refrigerant fluid according to the present disclosure;

wherein the circuit includes one or more of the following components:

cooling means for cooling the compressor;

an internal heat exchanger (IHX) that transfers heat from the high pressure fluid flowing between the condenser and expansion device to the low pressure fluid flowing between the evaporator and the compressor.

The circuit may further comprise an accumulator for liquid refrigerant. The accumulator may be located downstream of the evaporator.

Use of $CO_2$ in a refrigerant blend may disadvantageously both increase the discharge temperature and reduce the energy efficiency of the composition. High discharge temperatures may cause excessive compressor wear, reducing reliability and operating life.

A means of cooling the compressor may be provided to control the discharge temperature of the compressor, maintaining it below a maximum temperature, for example below 110° C., preferably below 100° C., and to provide an energy efficiency at least comparable to existing apparatus using $CO_2$, R32, R410A, R404A, R507, R1234yf, R134a, R1234ze(E), R123, R1336mzz(Z), R290, R600, and R600a.

Various cooling means for cooling the compressor may be employed. A combination of two or more cooling means may be provided.

Overcooling may also cause compressor damage. If liquid refrigerant is still present at the end of compression, just before it enters the discharge line, it may damage exhaust valves or, in extreme cases, cause 'liquid locking' that may damage the compressor drive mechanism.

In an advantageous embodiment of this disclosure the discharge temperature and the temperature of the vapour leaving the compressor, may be above the dew point of the refrigerant at that point of the circuit, for example 5° C. or more, for example 10° C. or more above the dew point. This may serve to minimise the risk of liquid damaging the compressor.

The cooling means may comprise one or more of:
1. a liquid injector adapted to inject liquid refrigerant into the compressor;
2. a cooling jacket in thermal contact with the compressor;
3. a compressor with channels in the compressor head and/or body through which flows fluid to remove heat generated by compression of the refrigerant.
4. injection of liquid refrigerant, drawn from a location between the end of the condenser and the expansion device, through the cooling jacket or channels in the compressor head and/or body.
5. injection of liquid refrigerant from between the end of the condenser and the expansion device into the compressor discharge pipe.
6. a cooling coil in thermal contact with the compressor;
7. a heat pipe in thermal contact with the compressor;
8. a thermo-syphon in thermal contact with the compressor, and
9. means for cold vapour injection into the compressor. Other cooling means may be employed.

A liquid injector may be configured to inject liquid refrigerant into a suction line or into a compression space of the compressor.

Various compressor types may be used with the wide glide, low GWP blends of this disclosure. Positive displacement types of compressors may include, but are not limited to, scroll, spool, moving vane, rotary rolling piston, screw, lobe and reciprocating compressors. Dynamic types of compression may include, but are not limited to, centrifugal and axial. An electric motor driving the compressor may be contained within a common casing. This configuration is known as an hermetic or semi-hermetic compressor. If the motor is external to the compressor casing, this is known as an open compressor. For the blends of this disclosure the preferred compressor designs have provision for liquid injection to reduce the discharge temperature, either by injection into suction port or into the compression volume. Alternatively, cold vapour may be injected into the compression volume.

The evaporator may be 'flooded'. In this specification a flooded evaporator means that the exiting refrigerant may be a 2-phase mixture of liquid and vapour. In many present day refrigeration and air conditioning apparatus the refrigerant may be completely evaporated and then further superheated by, for example 3 to 10K, for example 5 K to ensure that liquid does not enter the suction line and subsequently be transported to the compressor. This is typically achieved by using a thermostatic expansion valve whose degree of opening varies in response to a gas-bulb sensor attached to the suction line after the evaporator. The valve is adjusted such that the superheat of the vapour exiting the compressor is set to a specific value, for example 3 to 10K, for example 5 K. If the evaporator cooling duty increases, the sensor detects a superheat above 5 K and opens the valve to allow more refrigerant to enter the evaporator, restoring the superheat to the pre-set value. Those skilled in the art appreciate that if superheated vapour enters the compressor then the discharge vapour may also be superheated.

However, for the wide glide and very wide glide refrigerants disclosed in this specification, superheating the refrigerant may not be practical. Consequently, the evaporator may be flooded so that the exiting mixture is a 2-phase liquid/vapour which enters the suction line. To evaporate a further quantity of the liquid in the suction line, an internal heat exchanger (IHX) may be incorporated to transfer heat from the hotter, high pressure refrigerant returning from the condenser to the expansion device. The refrigerant exiting the IHX may be superheated so that it essentially contains no liquid phase, which ensures that no liquid will enter the compressor. Alternatively and advantageously, the refrigerant exiting the IHX may still contain some liquid which is allowed to enter the compressor where it flash evaporates as the refrigerant temperature is increased by compression or by heat from the electric motor in an hermetic unit. This arrangement reduces the discharge temperature of the refrigerant below the temperature that would be obtained if no liquid entered the compressor. This may serve to protect the compressor against excessive wear caused by overheating.

The discharged refrigerant may be superheated by at least 5 K, so that it is "dry", to avoid damage to the compressor by suction refrigerant being too wet. To ensure this condition is met as the thermal pumping duty varies, pressure and temperature sensors may be provided on the discharge line near the compressor. The sensor signals may be fed to a microprocessor containing thermodynamic data for the refrigerant, so that the microprocessor may calculate the superheat of the discharge vapour. A superheat value may control the degree of opening of an electronic expansion valve (EEV) and thus vary the flow of refrigerant into the evaporator. If the evaporator duty decreases, the discharge superheat will decrease with the risk of liquid being present in the compressor at the end of compression. Controlled by the pressure and temperature sensors, the EEV may reduce the refrigerant flow and thus increase the discharge superheat to the pre-set value. This is a method for controlled liquid injection to the compressor.

In another embodiment a thermal expansion valve (TXV) with a gas bulb sensor on the discharge line may be used to control the flow of the refrigerant entering the evaporator and thus ensure that the discharge temperature does not fall below the preset value.

Operating the thermal pumping apparatus with a flooded evaporator and the very wide glide compositions has further advantages compared to conventional operation whereby the refrigerant is completely evaporated and superheated. Firstly, incomplete evaporation reduces the temperature glide so that it may be closer to the required temperature profile for a specific application. Secondly, the total internal surface area of the evaporator is used for evaporation, an efficient mode of heat transfer compared to vapour superheating. Thirdly, allowing liquid to exit the evaporator enables the composition to include a low volatility, non-flammable HFO component in order to suppress the flammability of flammable components such as R32, and especially R1234yf and R1234ze(E) facilitating a decrease in, or elimination of, the flammability of the whole composition.

A common perception is that zeotropic blends with wide and very wide intrinsic glides will not work in thermal pumping equipment. However, the applicant has surprisingly found that a wide or very wide glide refrigerant of the present disclosure may be used in thermal pumping equipment. In conventional refrigeration equipment using typical evaporator pressure drops of ~0.3 to ~0.7 bar can induce actual temperature glides of ~4 to ~6 K. Evaporator glide is therefore a feature of existing refrigeration equipment using conventional HFC refrigerants, despite the simple modelling assumption that evaporation occurs at constant pressure and temperature. The intrinsic glides of the blends of this disclosure may offset the pressure induced glides so that the actual evaporator glides may be in the range 1 to 4 K, i.e. they may be smaller than in existing equipment. Preferably the actual glide should approximately equal the glide of the heat source being cooled.

In a conventionally designed apparatus, the pressure drop between the condenser and the evaporator is mainly across the expansion device. The pressure drops across the heat exchangers are minimised. However, the present inventors surprisingly have found that with wide and very wide glide blends the total pressure drop may be advantageously split between the expansion device and the evaporator. The bigger the pressure drop across the evaporator the smaller the observed glide, because the pressure induced glide opposes the intrinsic refrigerant glide. But, surprisingly, the energy efficiency and the suction capacity are independent of the evaporator pressure drop.

The evaporator pressure drop may be varied by making one of more of the following changes to the evaporator coil. In this specification, the term "coil" refers to a length of tubing which may or may not have a coiled configuration.
1. Reducing the diameter of the coil.
2. Increasing the length of the coil.
3. Increasing the surface roughness of the inner surface of the coil.

Combining a wide glide blend with an appropriate evaporator may advantageously allow a glide to be selected that matches the required temperature profile of the fluid being used as a heat source for the evaporator.

The above means for varying the evaporator pressure drop may also increase the heat area available for heat transfer, which may improve energy efficiency.

In a typical system the refrigerant enters the condenser from the compressor in a superheated state. The vapour then is cooled until it reaches its dew point and condenses until it is completely converted to liquid at its bubble point. Heat is removed from the liquid refrigerant so that it exits subcooled in the condenser, for example by 5 K. The wide glide refrigerant blends claimed in this specification may also undergo the same sequence in the condenser. However, it has been found that a wide glide blend may advantageously exit the condenser at its bubble point or with a mass quality greater than zero to minimise the condenser temperature glide. The refrigerant then enters the higher pressure side of the IHX where condensation followed by subcooling is effected by transferring heat to the lower temperature, lower pressure flow in the suction flow.

If the actual temperature glide is too large for a particular application, then a recirculating condenser design can be used wherein a portion of the liquid refrigerant from the condenser exit is pumped back to the condenser entry where it mixes and thermodynamically equilibrates with discharge gas from the compressor. This desuperheats the discharge gas and may cool the compressor by removing heat from the compressor head.

Various means may be employed to pump the liquid refrigerant, including but not limited to an ejector pump powered by the flow of the discharge gas or an electrically powered turbo-pump.

The actual temperature glide is reduced by an amount depending upon the recycle ratio, the higher the ratio the smaller the glide. This is especially advantageous for a heat pump attached to a load where the temperature difference between the entry and exit temperatures of a secondary refrigerant removing heat from the condenser is less than the actual glide in a single pass condenser, i.e. one having zero recirculation.

The refrigerant blends disclosed in this specification may have a combination of properties such as non-flammability and heat capacity, very low GWP, compatibility with materials of construction (steel, copper aluminium alloys, polymer seals), and polyolester (POE) lubricants commonly used in the refrigeration and HVAC industries which are equal or superior to presently used commercial refrigerants without needing to closely match the thermodynamic properties of these refrigerants. By adopting technologies specifically suited to the new blends disclosed in this specification, the performance may be optimised for specific applications for which existing refrigerants are used. Customary design constraints relevant to use of presently used commercial refrigerants may no longer apply. Importantly, for the present disclosure the shortcomings of a low GWP wide glide blend, as perceived by the traditional assessment of low or zero glide refrigerants, may be overcome by the adoption of appropriate technology.

For safety reasons the maximum operating pressure of a given design must not be exceeded. However, in designing new equipment for the blends claimed in this specification, higher operating pressures can be considered, provided they are advantageous. For example, the blends may deliver higher capacities and thus require the use of relatively small compressors. In this specification the selection of new blends may not be constrained by a perceived need to match the usually accepted maximum operating pressures of presently used commercial refrigerants.

The disclosure confers several advantages. The GWP of the refrigerant composition may be less than 400 and more preferably less than 150 and most preferably less than 10. The efficiency and capacity performance may be at least equal to that achieved when using units operating on presently used commercial refrigerants. Discharge temperatures of less than 100° C. may be achieved. Maximum operating pressures may be similar to those of units operating on presently used commercial refrigerants. This enables existing engineering components such as heat exchangers to be employed. The compositions may provide non-flammability to the ASHRAE safety classification A1. In preferred embodiments a single refrigerant blend may be used for refrigerant, air conditioning and heat pumping applications.

Each blend that is the subject of this disclosure may be used in refrigeration equipment lubricated by an oxygen containing oil, for example polyolester (POE) or polyalkylglycol (PAG), or by such oils mixed with a hydrocarbon lubricant up to 50%, for example a mineral oil, alkyl benzene or polyalpha-olefin. Those skilled in the art will appreciate that the compressor lubricant in a thermal pumping system must be matched to the properties of the refrigerant. The higher solubilities of some HFOs in POEs, may require that higher viscosity grades of these lubricants are used with the refrigerant blends of this disclosure. This is especially important for the lower volatility HFOs that are essential components in the blends of this disclosure. Alternatively, or additionally, a lubricant with a higher ratio of alkyl to ester groups may be preferred to reduce the solubilities of HFOs. This may be achieved by using POEs with a higher alkyl/ester ratio or mixing separate hydrocarbon and POE lubricants.

The disclosure is further described by means of example but not in any limitative sense.

EXAMPLE 1

A comparative calculation was made for R410A used in a typical split air conditioning system represented by FIG. 1, comprising an hermetic compressor 2, driven by electric motor 1, both components being enclosed in pressure casing 12, an air cooled condenser 3, an electronic expansion valve 4, an air heated evaporator 5, and an accumulator 6. The condenser exit temperature of the liquid refrigerant was 40° C. with 5 K subcooling. The exit temperature of the vapour from the evaporator was 12° C. with 5 K superheat. The unit was controlled by microprocessor 8, which received temperature values for the refrigerant exiting the evaporator from temperature sensor 7 via data line 11, and from a room thermostat 13 via data line 14. 8 controlled the system to maintain the room temperature at the required level in response to the input data by adjusting 4 via signal line 10, and the speed of 1, and thus the compressor capacity, by signal line 9.

The values of key parameters demonstrating the refrigerant performance are shown in Table 1.

EXAMPLE 2

A comparative calculation was made for R404A used in a typical freezer chest, also represented by FIG. 1, comprising an hermetic compressor 2, driven by electric motor 1, both components being enclosed in pressure casing 12, an air cooled condenser 3, an electronic expansion valve 4, an air heated evaporator 5, and an accumulator 6. The condenser exit temperature of the liquid refrigerant was 30° C. with 5 K subcooling. The exit temperature of the vapour from the evaporator was −30° C. with 5 K superheat. The unit was controlled by microprocessor 8, which received temperature values for the refrigerant exiting the evaporator from temperature sensor 7 via data line 10, and from a thermostat 13 located inside the freezer chest via data line 14. 8 controlled the system to maintain the freezer chest in the range −18 to −23° C. in response to the input data by adjusting 4 via signal line 10, and the speed of 1, and thus the compressor capacity, by signal line 9.

The values of key parameters demonstrating the refrigerant performance are shown in Table 2.

EXAMPLE 3

Figure 2:
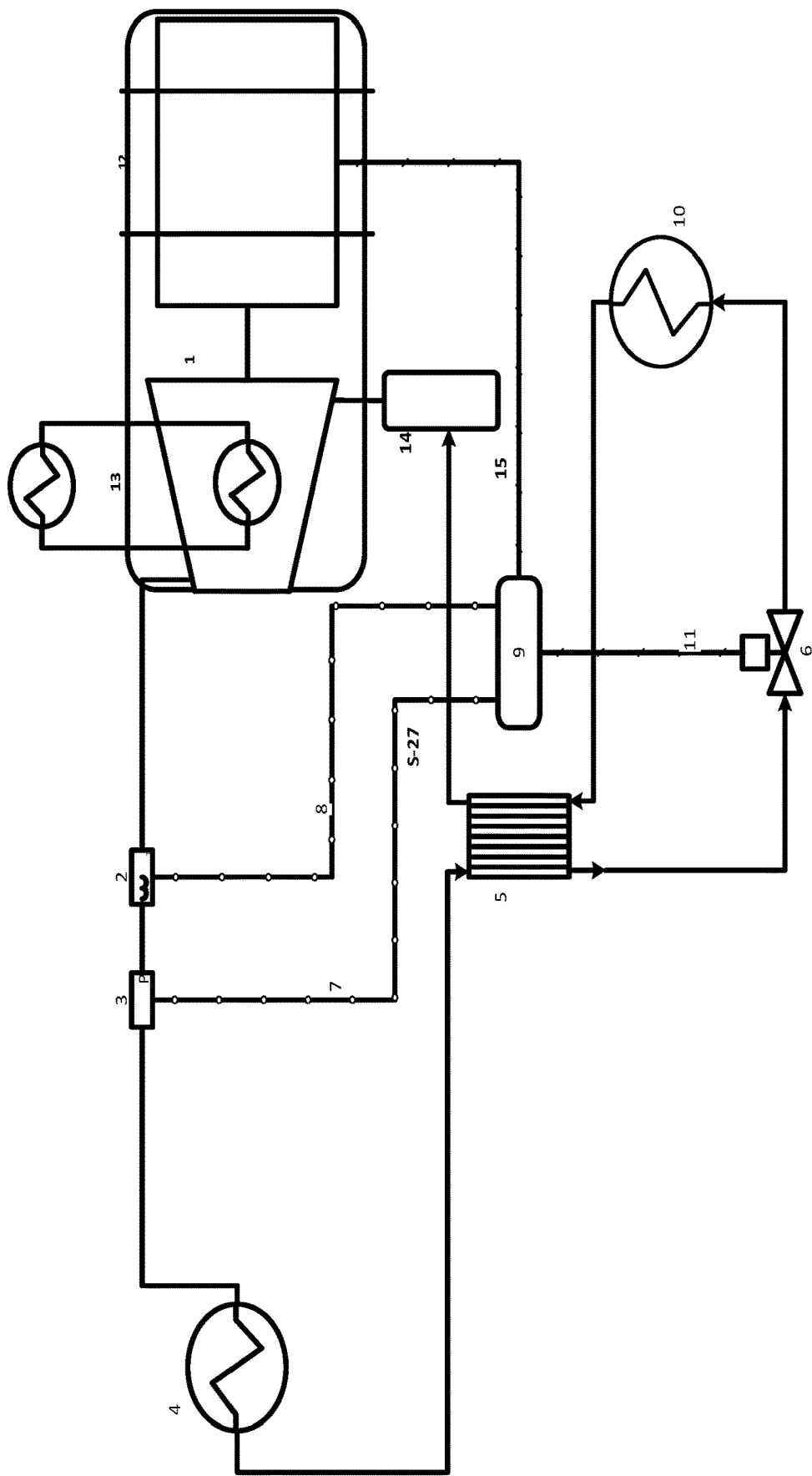

Calculations were performed for non-flammable blends with GWPs below 400 in a split air conditioning system (as shown in FIG. 2) comprising an accumulator 14, an hermetic compressor 1, a condenser 4, an internal heat exchanger 5 transferring heat from the higher temperature, higher pressure refrigerant stream to the lower temperature, lower pressure refrigerant stream, an electronic expansion valve 6 and an evaporator 10. The refrigerant flow in the circuit was controlled by pressure and temperature sensors in the discharge line immediately after the compressor. The compressor was driven by a variable-speed electric motor 12 and cooled by the removal of heat using a heat pipe 13.

The unit was controlled by a micro-processor 9, programmed with the thermodynamic properties of the refrigerant. The microprocessor received input data from a temperature sensor 2, via data line 8, and a pressure sensor 3, via data line 7, the sensors being located on the discharge line close to the compressor. The microprocessor transmitted output signals that varied the motor speed, via signal line 15, and the degree of opening of the expansion valve, via signal line 11, so the performance of the unit was matched to the required room temperature. In particular, the microprocessor ensured that the superheat of the refrigerant entering the discharge line was at least 5 K to avoid potentially damaging wet compression.

To provide proper comparison with R410A in Example 1, the refrigerant temperature at the condenser exit temperature was 40° C.; the evaporator entry temperature was 7° C.; the compressor isentropic efficiency was 0.7; and the electric motor efficiency was 0.9. A pressure drop was applied across the evaporator to provide an actual temperature glide of 11K.

The values of key parameters demonstrating the refrigerant performance of blends 1 to 12 are shown in Tables 3a and 3b.

EXAMPLE 4

Figure 3:
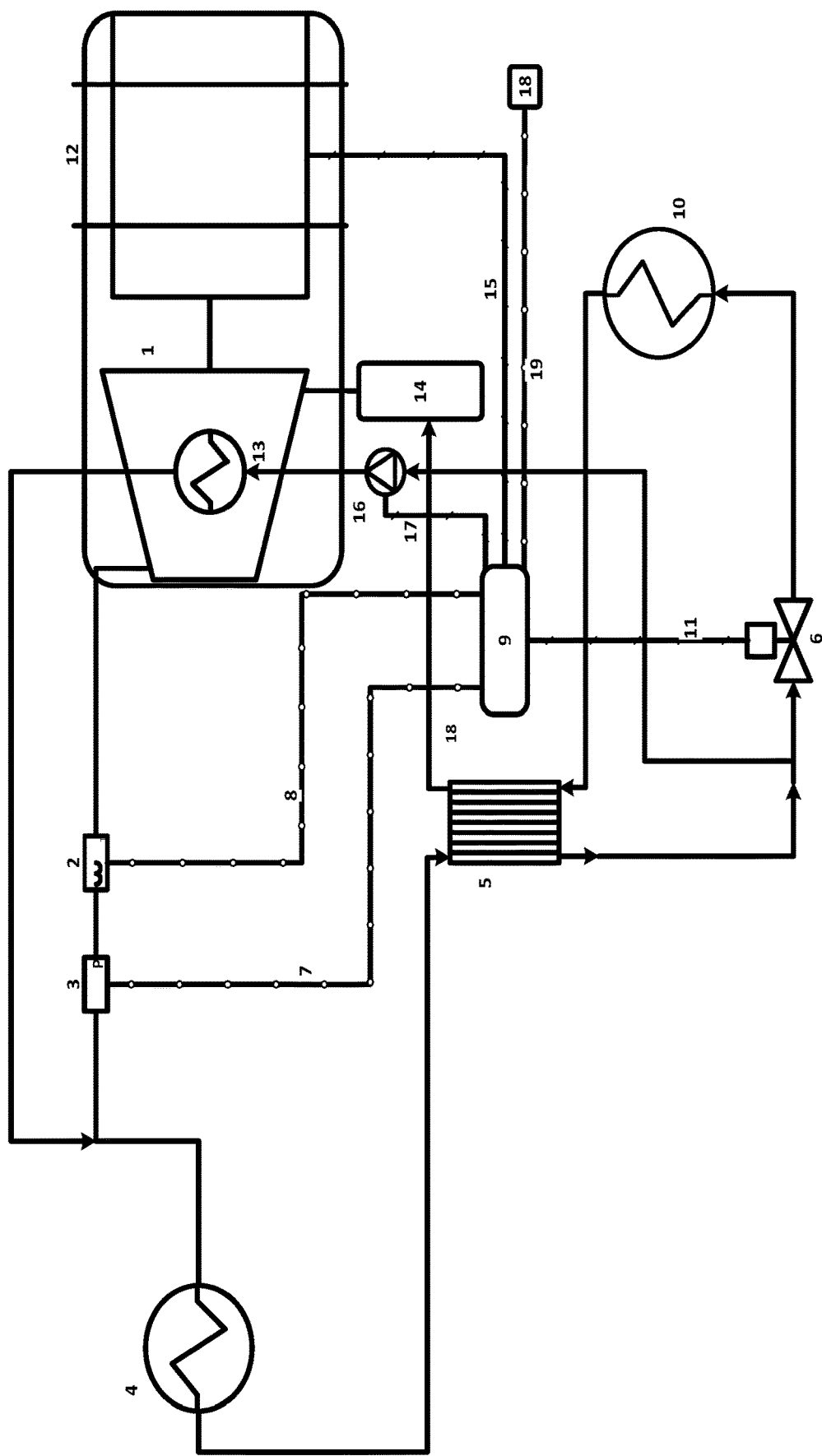

Calculations were performed for non-flammable blends with GWPs below 400 in a refrigeration system (as shown in FIG. 3) comprising an accumulator 14, an hermetic compressor 1, a condenser 4, an internal heat exchanger 5 transferring heat from the higher temperature, higher pressure refrigerant stream to the lower temperature, lower pressure refrigerant stream, an electronic expansion valve 6 and an evaporator 10. The refrigerant flow in the circuit was controlled by pressure and temperature sensors in the discharge line immediately after the compressor. The compressor was driven by a variable-speed electric motor 12 and cooled by the removal of heat by pumping liquid refrigerant into heat exchanger 13 in contact with the compressor head using an injector pump or liquid turbopump 16 drawing liquid refrigerant from the liquid line just before the expansion valve 6. The unit was controlled by a micro-processor 9, programmed with the thermodynamic properties of the refrigerant. The microprocessor received input data from a temperature sensor 2, via data line 8, and a pressure sensor 3, via data line 7, the sensors being located on the discharge line close to the compressor. The microprocessor transmitted output signals that varied the motor speed, via signal line 15, and the degree of opening of the expansion valve, via signal line 11, so the performance of the unit was matched to the required room temperature. In particular, the microprocessor ensured that the superheat of the refrigerant entering the discharge line was at least 5 K to avoid potentially damaging wet compression.

To provide proper comparison with R404A in Example 2, the refrigerant temperature at the condenser exit temperature was 30° C.; the evaporator entry temperature was −35° C.; the compressor isentropic efficiency was 0.7; and the electric motor efficiency was 0.9. A pressure drop was applied across the evaporator to provide an actual temperature glide of 5K.

The values of key parameters for blends 13 to 24 are shown in Tables 4a and 4b.

EXAMPLE 5

Calculations were performed for a non-flammable blend (25) with a GWP of 2 consisting of 5% R1224yd(Z), 69% $CO_2$ and 26% R1234ze(E) in a split air conditioning system (FIG. 4) comprising an accumulator 13; a two-stage, integrated hermetic compressor comprising a variable speed electric motor 4, a lower pressure first stage 1 and a higher pressure second stage 2; a condenser 5; an internal heat exchanger (IHX) 6 transferring heat from the higher temperature, higher pressure refrigerant stream to the lower temperature, lower pressure refrigerant stream; an electronic expansion valve 7 and an evaporator 8. The refrigerant flow in the circuit was controlled by pressure and temperature sensors, 10 and 11, in the suction line immediately after the IHX 6.

Gas discharged from the first compression stage was passed through an external heat exchanger, called an intercooler 3, where it was cooled by ambient air before to entering the gas volume within the compressor casing surrounding the electric motor and the 2-stage compressor. The gas cooled the motor and then entered the suction port of the second compression stage, where it was further compressed and then discharged to the condenser.

The unit was controlled by a micro-processor 9, programmed with the thermodynamic properties of the refrigerant. The microprocessor received input data from the temperature sensor 11, the pressure sensor 10 and the temperature sensor 14 that measured the room temperature. The microprocessor transmitted output signals that varied the motor speed, via signal line 15, and the degree of opening of the expansion valve, via signal line 12, so the performance of the unit was optimised and matched to the required room temperature. In particular, the microprocessor ensured that the superheat of the refrigerant entering the compressor was at least 2 K and preferably 5 K to avoid potentially damaging wet compression.

To provide proper comparison with R410A in Example 1, the refrigerant temperature at the condenser exit temperature was 40° C.; the evaporator entry temperature was 7° C.; the compressor isentropic efficiency was 0.7; and the electric motor efficiency was 0.9. A pressure drop was applied across the evaporator to provide an actual temperature glide of 11K.

The values of key parameters demonstrating the refrigerant performance for a blend consisting of 5% R1224yd(Z), 69% $CO_2$ and 26% R1234ze(E) are shown in Table 5. This blend is superior to R410A for air conditioning because it combines a GWP of only 2 with a suction volumetric capacity of 107808 kJ/kg (R410A: 5832 kJ/kg) but with a comparable energy efficiency. The blend is superior to $CO_2$, because it operates at a maximum pressure of ~60 bar ($CO_2$: typically 130 bar), which reduces back leakage of vapour in the compressor and provides operation on a subcritical cycle thus allowing efficient condensing heat transfer to ambient.

EXAMPLE 6

Figure 4:
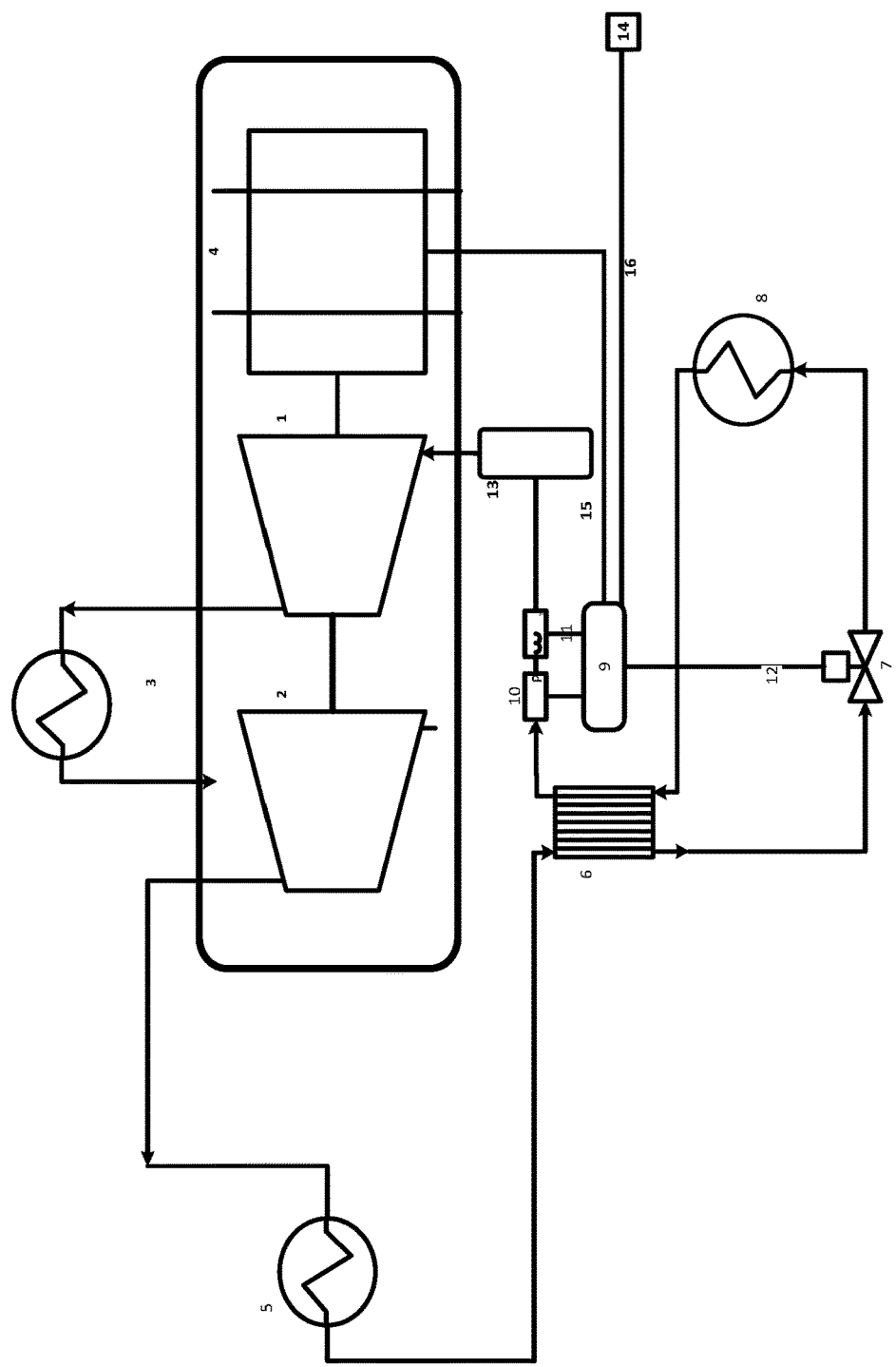

Calculations were performed for a non-flammable blend 26 with a GWP of 2 consisting of 10% R1224yd(Z), 67% $CO_2$ and 23% R1234yf in a split air conditioning system (as shown in FIG. 4), operating under similar conditions to Example 5. The values of key parameters demonstrating the refrigerant performance are shown in Table 5. This blend is superior to R410A for air conditioning because it combines a GWP of only 2 with a suction volumetric capacity of 11156 kJ/kg (R410A: 5832 kJ/kg) but with a comparable energy efficiency. The blend is superior to $CO_2$, because it operates at a maximum pressure of ~60 bar ($CO_2$: typically 130 bar) which reduces back leakage of vapour in the compressor and operates on a subcritical cycle which allows efficient condensing heat transfer to ambient.

EXAMPLE 7

Figure 5:
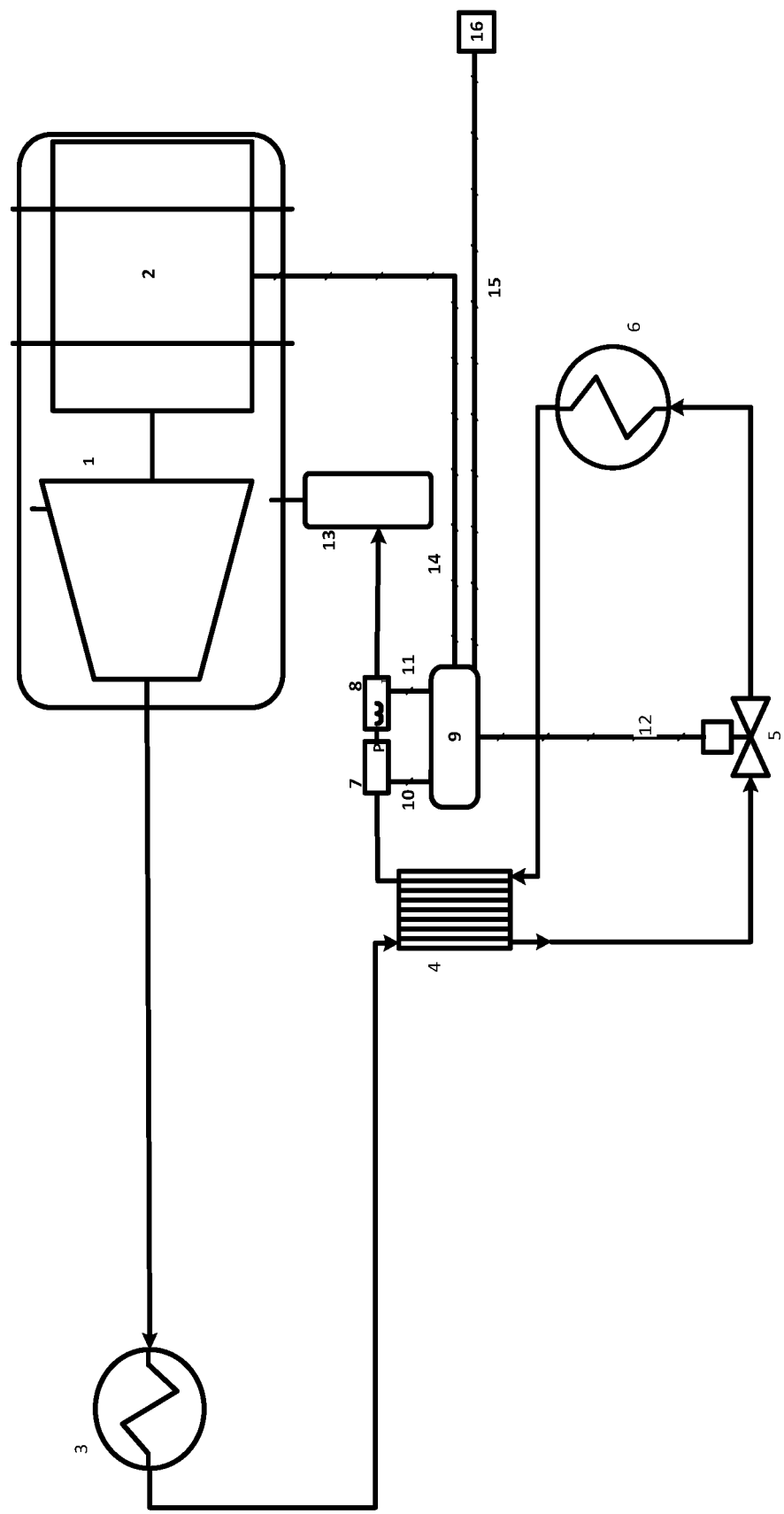

Calculations were performed for a non-flammable blend 27 with a GWP of 2 consisting of 8% R1224yd(Z), 70% $CO_2$ and 22% R1234ze(E) in the air conditioning system of an electrically powered vehicle (FIG. 5) comprising a single-stage hermetic compressor driven by a variable speed electric motor 2; a condenser 3; an internal heat exchanger (IHX) 4 transferring heat from the higher temperature, higher pressure refrigerant stream to the lower temperature, lower pressure refrigerant stream; an electronic expansion valve 5; an evaporator 6; and an accumulator 13 The refrigerant flow in the circuit included pressure and temperature sensors, 7 and 8, in the suction line immediately after the IHX 4.

The unit was controlled by a micro-processor 9, programmed with the thermodynamic properties of the refrigerant. The microprocessor received input data from the temperature sensor 11 via data line 10, the pressure sensor 10 via data line 11, and the temperature sensor 16 via data line 15 that measured the vehicle cabin temperature. The microprocessor transmitted output signals that varied the motor speed, via signal line 14, and the degree of opening of the expansion valve, via signal line 12, so the performance of the unit was optimised and matched to the required cabin temperature. In particular, the microprocessor ensured that the superheat of the refrigerant entering the compressor was at least 2 K and preferably 5 K to avoid potentially damaging wet compression.

The values of key parameters demonstrating the refrigerant performance for a blend consisting of 8% R1224yd(Z), 70% $CO_2$ and 22% R1234ze(E) are shown in Table 6. This blend (nonflammable and GWP 2) is superior to both R134a (nonflammable but having a high GWP 1300) and its replacement R1234yf (very low GWP (2) but flammable) for vehicle air conditioning. It also benefits from a much higher suction specific volumetric capacity than these refrigerants. The blend is also superior to $CO_2$, because it operates at a maximum pressure of ~66 bar ($CO_2$: 130 bar) which reduces back leakage of vapour in the compressor and operates on a subcritical cycle which allows efficient condensing heat transfer to ambient.

Table 7 also provides performance data for Blend 28 in an automobile air conditioning system.

EXAMPLE 8

The performances of blends 29 to 37 (Tables 7a and 7b) containing HFC152a in a low temperature refrigeration unit described in Example 4 were calculated. The results are shown in Table 7.

EXAMPLE 9

The performances of blends 38 to 42 retrofitted for HFC32 in an existing split air conditioner were calculate and compared with HFC32 (43 in Table 8b). The results are shown in Tables 8a and 8b. These blends provide acceptable energy efficiencies and suction cooling capacities compared to HFC32 with GWPs less than half that of HFC32, thus reducing the direct contribution of split airconditioner to global warming.

EXAMPLE 10

The performances of blends 44 to 45 (Table 9) in a refrigeration unit similar to that described in Example 4 were calculated. The results, shown in Table 9, show that good suction cooling capacities and efficiencies were obtained. The blends have GWPs less than 150, a value that is being mandated as the regulatory upper limit by some governments to force the phase-out of high GWP refrigerants, for such as R404A and R507A.

EXAMPLE 11

The performances of blends 48 to 51 (Table 10)) in a split air conditioning unit similar to that described in Example 3 were calculated. The results, shown in Table 10, show that good suction cooling capacities and efficiencies were obtained that comare favourably with existing refrigerant R410A and HFC32 that are presently used in this application. The blends have GWPs less than 150, a value that is being mandated as the regulatory upper limit by some governments to force the phase-out of high GWP refrigerants, for such as R410A and HFC32.

TABLE 1

| | | R410A |
|---|---|---|
| Input | | |
| Cooling duty | kW | 1 |
| Condenser | | |
| Bubble point | C. | 40 |
| Subcool | K | 5 |
| Evaporator | | |
| Dew point | C. | 7 |
| Superheat | K | 5 |
| Compressor | | |
| Isentropic efficiency | | 0.7 |
| Electric motor efficiency | | 0.9 |
| Output | | |
| Condenser | | |
| Condenser midpoint | C. | 45.1 |
| Condenser glide | K | 0.1 |

TABLE 1-continued

| | | R410A |
|---|---|---|
| Evaporator | | |
| Evaporator midpoint | C. | 7 |
| Evaporator entry temperature | C. | 7 |
| Evaporator glide | K | 0.1 |
| Flow rate | kg/(kWc) | 0.00613 |
| Compressor | | |
| Discharge temperature | C. | 76.4 |
| Discharge pressure | bara | 27.3 |
| System | | |
| COP | | 3.91 |
| Suction capacity | kJ/m^3 | 5832 |

TABLE 2

| | | R404A |
|---|---|---|
| Input | | |
| Cooling duty | kW | 1 |
| Condenser | | |
| Bubble point | C. | 35 |
| Subcool | K | 5 |

TABLE 2-continued

| | | R404A |
|---|---|---|
| Evaporator | | |
| Dew point | C. | −35 |
| Superheat | K | 5 |
| Compressor | | |
| Isentropic efficiency | | 0.7 |
| Electric motor efficiency | | 0.9 |
| Output | | |
| Condenser | | |
| Condenser midpoint | C. | 35.2 |
| Condenser glide | K | 0.4 |
| Evaporator | | |
| Evaporator midpoint | C. | −35.2 |
| Evaporator entry temperature | C. | −35.5 |
| Evaporator glide | K | 0.5 |
| Flow rate | kg/(s.kW) | 0.00937 |
| Compressor | | |
| Discharge temperature | C. | 77.8 |
| Discharge pressure | bara | 16.2 |
| System | | |
| COP | | 1.49 |
| Suction capacity | kJ/m^3 | 855 |

TABLE 3a

| | | Composition (mass fraction) Blend: | | | | | |
|---|---|---|---|---|---|---|---|
| | | 1 | 2 | 3 | 4 | 5 | 6 |
| HFO1224yd(Z) | | 0.08 | 0.08 | 0.12 | 0.12 | 0.08 | 0.08 |
| carbon dioxide | | 0.35 | 0.4 | 0.4 | 0.3 | 0.24 | 0.22 |
| HFO1234yf | | 0.36 | 0.36 | 0.37 | 0.43 | 0.53 | 0.58 |
| HFC227ea | | 0 | 0 | 0 | 0 | 0 | 0 |
| HFC1234ze(E) | | 0.15 | 0.1 | 0.05 | 0.05 | 0.1 | 0.05 |
| HFC32 | | 0 | 0 | 0 | 0.1 | 0.05 | 0.07 |
| HFO1336mzzz | | 0 | 0 | 0 | 0 | 0 | 0 |
| HFO1234zez | | 0 | 0 | 0 | 0 | 0 | 0 |
| HFO1233zd(E) | | 0.06 | 0.06 | 0.06 | 0 | 0 | 0 |
| GWP | | 1 | 1 | 1 | 69 | 35 | 48 |
| Input | | | | | | | |
| Condenser | | | | | | | |
| Exit temperature | C. | 40 | 40 | 40 | 40 | 40 | 40 |
| Exit quality | m/m | 0 | 0 | 0 | 0 | 0 | 0 |
| IHX high pressure condensation | | | | | | | |
| Liquid exit/suction entry difference | kJ/kg | 5 | 5 | 5 | 5 | 5 | 5 |
| Evaporator | | | | | | | |
| Entry temperature | C. | 7 | 7 | 7 | 7 | 7 | 7 |
| Exit temperature | C. | 18 | 18 | 18 | 18 | 18 | 18 |
| Exit quality | m/m | 0.9 | 0.9 | 0.9 | 0.9 | 0.9 | 0.9 |
| Compressor | | | | | | | |
| Isentropic efficiency | | 0.7 | 0.7 | 0.7 | 0.7 | 0.7 | 0.7 |
| Electric motor efficiency | | 0.9 | 0.9 | 0.9 | 0.9 | 0.9 | 0.9 |
| Enthalpy removed by heat pipe | | 0.1436 | 0.1436 | 0.1446 | 0.1398 | 0.1338 | 0.1351 |
| Output | | | | | | | |
| Condenser | | | | | | | |
| Pressure | bara | 44.09 | 48.1 | 48.47 | 41.18 | 35.71 | 34.36 |
| Dew point | C. | 75.2 | 73.4 | 75.5 | 68.5 | 69.6 | 68.2 |
| Mid point | C. | 57.6 | 56.7 | 57.8 | 54.3 | 54.8 | 54.1 |
| Glide | K | 35.2 | 33.4 | 35.5 | 28.5 | 29.6 | 28.2 |
| Enthalpy loss | kW | 1.26 | 1.262 | 1.285 | 1.189 | 1.181 | 1.164 |
| IHX high pressure side | | | | | | | |
| Enthalpy transferred from suction line | kJ/kWc | 0.115 | 0.115 | 0.114 | 0.117 | 0.192 | 0.185 |
| Bubble point | C. | 40 | 40 | 40 | 40 | 40 | 40 |
| Exit temperature | C. | 31.3 | 31.7 | 31.8 | 31 | 23 | 23.8 |

TABLE 3a-continued

| | | Composition (mass fraction) Blend: | | | | | |
|---|---|---|---|---|---|---|---|
| | | 1 | 2 | 3 | 4 | 5 | 6 |
| Evaporator | | | | | | | |
| Entry pressure | bara | 19.44 | 21.68 | 21.96 | 18.01 | 16.12 | 15.28 |
| Midpoint | C. | 12.5 | 12.5 | 12.5 | 12.5 | 12.5 | 12.5 |
| Glide | C. | 11 | 11 | 11 | 11 | 11 | 11 |
| Exit pressure | bara | 10.25 | 11.85 | 11.31 | 11.59 | 9.73 | 9.71 |
| Enthalpy gain | kWc | 1 | 1 | 1 | 1 | 1 | 1 |
| IHX low pressure side | | | | | | | |
| Enthalpy transferred to liquid line | kW/kWc | 0.115 | 0.115 | 0.114 | 0.117 | 0.192 | 0.185 |
| Exit temperature | C. | 21.4 | 21.7 | 21.9 | 21.2 | 26 | 24.8 |
| Dew point | C. | 24.3 | 25.2 | 26 | 23.4 | 21.6 | 21.4 |
| Compressor | | | | | | | |
| Entry temperature to compressor | C. | 21.4 | 21.7 | 21.9 | 21.2 | 26 | 24.8 |
| Discharge temperature | C. | 81.9 | 82.3 | 84.7 | 73.6 | 81.1 | 77.2 |
| Compression ratio P/P | | 4.3 | 4.06 | 4.29 | 3.55 | 3.67 | 3.54 |
| System | | | | | | | |
| Suction specific volume | kJ/m^3 | 5017 | 5558 | 5265 | 5821 | 5248 | 5270 |
| Electrical energy input | kJ/kWc | 0.234 | 0.236 | 0.256 | 0.17 | 0.163 | 0.148 |
| COP cooling | | 4.28 | 4.24 | 3.9 | 5.88 | 6.14 | 6.77 |
| Mass flow rate | kg/kWc | 0.00718 | 0.00718 | 0.00723 | 0.00699 | 0.00669 | 0.00676 |

TABLE 3b

| | | Composition (mass fraction) Blend: | | | | | |
|---|---|---|---|---|---|---|---|
| | | 7 | 8 | 9 | 10 | 11 | 12 |
| HFO1224yd(Z) | | 0.08 | 0.08 | 0 | 0.08 | 0.08 | 0.1 |
| carbon dioxide | | 0.35 | 0.19 | 0.19 | 0.05 | 0.1 | 0.12 |
| HFO1234yf | | 0.36 | 0.41 | 0.46 | 0.25 | 0.42 | 0.42 |
| HFC227ea | | 0 | 0 | 0 | 0 | 0.05 | 0 |
| HFC1234ze(E) | | 0 | 0.1 | 0 | 0.11 | 0.05 | 0.05 |
| HFC32 | | 0.15 | 0.16 | 0.21 | 0.45 | 0.3 | 0.25 |
| HFO1336mzzz | | 0 | 0 | 0 | 0 | 0 | 0 |
| HFO1234zez | | 0 | 0 | 0 | 0 | 0 | 0 |
| HFO1233zd(E) | | 0.06 | 0.06 | 0.14 | 0.06 | 0 | 0.06 |
| GWP | | 102 | 109 | 143 | 305 | 364 | 170 |
| Input | | | | | | | |
| Condenser | | | | | | | |
| Exit temperature | C. | 40 | 40 | 40 | 40 | 40 | 40 |
| Exit quality | m/m | 0 | 0 | 0 | 0 | 0 | 0 |
| IHX high pressure condensation | | | | | | | |
| Liquid exit/suction entry difference | kJ/kg | 5 | 5 | 5 | 5 | 5 | 5 |
| Evaporator | | | | | | | |
| Entry temperature | C. | 7 | 7 | 7 | 7 | 7 | 7 |
| Exit temperature | C. | 18 | 18 | 18 | 18 | 18 | 18 |
| Exit quality | m/m | 0.9 | 0.9 | 0.9 | 0.9 | 0.9 | 0.9 |
| Compressor | | | | | | | |
| Isentropic efficiency | | 0.7 | 0.7 | 0.7 | 0.7 | 0.7 | 0.7 |
| Electric motor efficiency | | 0.9 | 0.9 | 0.9 | 0.9 | 0.9 | 0.9 |
| Enthalpy removed by heat pipe | | 0.0646 | 0.131 | 0.1273 | 0.0543 | 0.1218 | 0.1243 |
| Output | | | | | | | |
| Condenser | | | | | | | |
| Pressure | bara | 45.12 | 32.31 | 32.95 | 23.58 | 26.58 | 27.4 |
| Dew point | C. | 66.6 | 67.8 | 66.7 | 54 | 56.4 | 63.1 |
| Mid point | C. | 53.3 | 53.9 | 53.3 | 47 | 48.2 | 51.5 |
| Glide | K | 26.6 | 27.8 | 26.7 | 14 | 16.4 | 23.1 |
| Enthalpy loss | kW | 1.218 | 1.164 | 1.161 | 1.089 | 1.074 | 1.123 |
| IHX high pressure side | | | | | | | |
| Enthalpy transferred from suction line | kJ/kWc | 0.144 | 0.144 | 0.139 | 0.158 | 0.176 | 0.157 |
| Bubble point | C. | 40 | 40 | 40 | 40 | 40 | 40 |
| Exit temperature | C. | 28.8 | 27.2 | 27.6 | 23 | 23 | 24.9 |

TABLE 3b-continued

| | | Composition (mass fraction) Blend: | | | | | |
|---|---|---|---|---|---|---|---|
| | | 7 | 8 | 9 | 10 | 11 | 12 |
| Evaporator | | | | | | | |
| Entry pressure | bara | 20.46 | 13.81 | 14.16 | 9.83 | 11.31 | 11.61 |
| Midpoint | C. | 12.5 | 12.5 | 12.5 | 12.5 | 12.5 | 12.5 |
| Glide | K | 11 | 11 | 11 | 11 | 11 | 11 |
| Exit pressure | bara | 13.48 | 9.07 | 9.64 | 9.4 | 10 | 8.64 |
| Enthalpy gain | kWc | 1 | 1 | 1 | 1 | 1 | 1 |
| IHX low pressure side | | | | | | | |
| Enthalpy transferred to liquid line | kW/kWc | 0.144 | 0.144 | 0.139 | 0.158 | 0.176 | 0.157 |
| Exit temperature | C. | 22.9 | 21.8 | 22.2 | 23.5 | 25.6 | 22.2 |
| Dew point | C. | 25 | 22.7 | 23.7 | 21.5 | 20.8 | 22.5 |
| Compressor | | | | | | | |
| Entry temperature to compressor | C. | 22.9 | 21.8 | 22.2 | 23.5 | 25.6 | 22.2 |
| Discharge temperature | C. | 82 | 72.9 | 72.5 | 62.7 | 62.9 | 68.1 |
| Compression ratio P/P | | 3.35 | 3.56 | 3.42 | 2.51 | 2.66 | 3.17 |
| System | | | | | | | |
| Suction specific volume | kJ/m^3 | 6893 | 5048 | 5326 | 6117 | 5932 | 5086 |
| Electrical energy input | kJ/kWc | 0.254 | 0.148 | 0.145 | 0.129 | 0.067 | 0.11 |
| COP cooling | | 3.94 | 6.77 | 6.9 | 7.78 | 14.97 | 9.06 |
| Mass flow rate | kg/kWc | 0.00646 | 0.00655 | 0.00637 | 0.00543 | 0.00609 | 0.00621 |

TABLE 4a

| | | Composition (mass fraction) | | | | | |
|---|---|---|---|---|---|---|---|
| | | 13 | 14 | 15 | 16 | 17 | 18 |
| HFO1224ydz | | 0 | 0.25 | 0.11 | 0.13 | 0 | 0.1 |
| carbon dioxide | | 0.4 | 0.4 | 0.35 | 0.3 | 0.21 | 0.3 |
| HFO1234yf | | 0.6 | 0 | 0.18 | 0.03 | 0.12 | 0.14 |
| HFC227ea | | 0 | 0 | 0 | 0 | 0 | 0 |
| HFC1234ze(E) | | 0 | 0.35 | 0.23 | 0.28 | 0.28 | 0.12 |
| HFC32 | | 0 | 0 | 0 | 0.1 | 0.13 | 0.08 |
| HFO1336mzzz | | 0 | 0 | 0.13 | 0.16 | 0.16 | 0.16 |
| HFO1233zd(E) | | 0 | 0 | 0 | 0 | 0.1 | 0.1 |
| Cooling Duty | kW | 1 | 1 | 1 | 1 | 1 | 1 |
| GWP | | 1 | 1 | 1 | 69 | 89 | 55 |
| Input | | | | | | | |
| Condenser | | | | | | | |
| Exit temperature | C. | 30 | 30 | 30 | 30 | 30 | 30 |
| Exit quality | m/m | 0 | 0 | 0 | 0 | 0 | 0 |
| IHX high pressure condensation | | | | | | | |
| Liquid exit/suction entry difference | K | 5 | 5 | 5 | 5 | 5 | 5 |
| Evaporator | | | | | | | |
| Entry temperature | C. | −35 | −35 | −35 | −35 | −35 | −35 |
| Exit temperature | C. | −30 | −30 | −30 | −30 | −30 | −30 |
| Exit quality | m/m | 0.8 | 0.7 | 0.7 | 0.7 | 0.6 | 0.6 |
| Compressor | | | | | | | |
| Isentropic efficiency | | 0.7 | 0.7 | 0.7 | 0.7 | 0.7 | 0.7 |
| Electric motor efficiency | | 0.9 | 0.9 | 0.9 | 0.9 | 0.9 | 0.9 |
| Discharge temperature—dew point diff | K | 5 | 5 | 5 | 5 | 5 | 5 |
| Heat removed from compressor | kJ/kWc | 0.262 | 0.318 | 0.323 | 0.302 | 0.284 | 0.289 |
| Refrigerant flow cooling compressor × $10^3$ | kg/kWc | 8.74 | 9.09 | 9.24 | 8.63 | 9.47 | 9.64 |
| Output | | | | | | | |
| Condenser | | | | | | | |
| Pressure | bara | 40.72 | 39.70 | 37.02 | 33.63 | 27.38 | 34.27 |
| Entry quality | kg/kg | 0.492 | 0.395 | 0.390 | 0.387 | 0.345 | 0.345 |
| Mid point | C. | 37.6 | 38.9 | 39.4 | 39.2 | 38.5 | 38.6 |
| Glide | K | 15.2 | 17.8 | 18.8 | 18.3 | 17.0 | 17.2 |
| Enthalpy loss | kW | 1.66 | 1.73 | 1.76 | 1.64 | 1.80 | 1.83 |
| IHX high pressure side | | | | | | | |
| Enthalpy transferred from suction line | kJ/kWc | 0.658 | 1.056 | 1.138 | 1.055 | 1.389 | 1.509 |
| Exit temperature | C. | 9.0 | −5.2 | −8.6 | −8.5 | −18.5 | −21.1 |

TABLE 4a-continued

| | | Composition (mass fraction) | | | | | |
|---|---|---|---|---|---|---|---|
| | | 13 | 14 | 15 | 16 | 17 | 18 |
| Evaporator | | | | | | | |
| Entry pressure | bara | 6.28 | 6.63 | 6.29 | 5.37 | 4.42 | 6.15 |
| Midpoint | C. | −32.5 | −32.5 | −32.5 | −32.5 | −32.5 | −32.5 |
| Glide | K | 5 | 5 | 5 | 5 | 5 | 5 |
| Exit pressure | bara | 3.34 | 2.79 | 2.59 | 2.32 | 2.26 | 3.41 |
| Enthalpy gain | kWc | 1.000 | 1.000 | 1.000 | 1.000 | 1.000 | 1.000 |
| IHX low pressure side | | | | | | | |
| Enthalpy transferred to liquid line | kW/kWc | 0.658 | 1.056 | 1.138 | 1.055 | 1.389 | 1.509 |
| Exit temperature | | −5.4 | −1.6 | 11.4 | 5.7 | 11.2 | 19.2 |
| Dew point | | −22.8 | −4.3 | 0.3 | 0.8 | 2.3 | 13.1 |
| Compressor | | | | | | | |
| Entry temperature to compressor | C. | −5.4 | −1.6 | 11.4 | 5.7 | 11.2 | 19.2 |
| Discharge temperature | C. | 79.5 | 80.9 | 85.3 | 82.9 | 81.1 | 88.4 |
| Compression ratio P/P | | 12.17 | 14.25 | 14.27 | 14.50 | 12.12 | 10.04 |
| System | | | | | | | |
| Suction specific volume | kJ/m^3 | 1391 | 1123 | 1043 | 994 | 914 | 1269 |
| Electrical energy input | kJ/kWc | 0.595 | 0.596 | 0.589 | 0.561 | 0.560 | 0.553 |
| COP cooling | | 1.68 | 1.68 | 1.70 | 1.78 | 1.79 | 1.81 |
| Mass flow rate $\times 10^3$ | kg/kWc | 8.74 | 9.09 | 9.24 | 8.63 | 9.47 | 9.64 |

TABLE 4b

| | | Composition (mass fraction) | | | | | |
|---|---|---|---|---|---|---|---|
| | | 19 | 20 | 21 | 22 | 23 | 24 |
| HFO1224yd(Z) | | 0.05 | 0.15 | 0 | 0.15 | 0 | 0.17 |
| carbon dioxide | | 0.14 | 0.1 | 0.11 | 0.1 | 0.1 | 0.08 |
| HFO1234yf | | 0.1 | 0.22 | 0.25 | 0.35 | 0.19 | 0.15 |
| HFC227ea | | 0 | 0 | 0 | 0 | 0.1 | 0.03 |
| HFO1234ze(E) | | 0.31 | 0.32 | 0.22 | 0 | 0.2 | 0.13 |
| HFC32 | | 0.22 | 0.21 | 0.2 | 0.4 | 0.2 | 0.3 |
| HFO1336mzzz | | 0.08 | 0 | 0.12 | 0 | 0.11 | 0.04 |
| HFO1233zd(E) | | 0.1 | 0 | 0.1 | 0 | 0.1 | 0.1 |
| Cooling Duty | kW | 1 | 1 | 1 | 1 | 1 | 1 |
| GWP | | 150 | 143 | 136 | 271 | 456 | 300 |
| Input | | | | | | | |
| Condenser | | | | | | | |
| Exit temperature | C. | 30 | 30 | 30 | 30 | 30 | 30 |
| Exit quality | m/m | 0.1 | 0 | 0 | 0 | 0 | 0 |
| IHX high pressure condensation | | | | | | | |
| Liquid exit/suction entry difference | K | 5 | 5 | 5 | 5 | 5 | 5 |
| Evaporator | | | | | | | |
| Entry temperature | C. | −35 | −35 | −35 | −35 | −35 | −35 |
| Exit temperature | C. | −30 | −30 | −30 | −30 | −30 | −30 |
| Exit quality | m/m | 0.6 | 0.7 | 0.6 | 0.6 | 0.7 | 0.7 |
| Compressor | | | | | | | |
| Isentropic efficiency | | 0.7 | 0.7 | 0.7 | 0.7 | 0.7 | 0.7 |
| Electric motor efficiency | | 0.9 | 0.9 | 0.9 | 0.9 | 0.9 | 0.9 |
| Discharge temperature—dew point diff | K | 5 | 5 | 5 | 5 | 5 | 5 |
| Heat removed from compressor | kJ/kWc | 0.248 | 0.174 | 0.169 | 0.150 | 0.119 | 0.111 |
| Refrigerant flow cooling compressor $\times 10^3$ | kg/kWc | 4.14 | 1.39 | 4.23 | 3.74 | 1.59 | 1.48 |
| Output | | | | | | | |
| Condenser | | | | | | | |
| Pressure | bara | 21.20 | 19.82 | 20.62 | 22.18 | 20.00 | 19.31 |
| Entry quality | kg/kg | 0.604 | 0.880 | 0.567 | 0.642 | 0.841 | 0.840 |
| Mid point | C. | 39.9 | 41.7 | 40.2 | 35.7 | 44.7 | 43.1 |
| Glide | K | 19.8 | 23.4 | 20.5 | 11.4 | 29.3 | 26.3 |
| Enthalpy loss | kW | 1.57 | 1.32 | 1.61 | 1.42 | 1.51 | 1.41 |
| IHX high pressure side | | | | | | | |
| Enthalpy transferred from suction line | kJ/kWc | 1.175 | 0.649 | 1.016 | 0.891 | 0.630 | 0.583 |
| Exit temperature | C. | −23.4 | −23.2 | −25.0 | −20.7 | −15.5 | −14.7 |

TABLE 4b-continued

| | | Composition (mass fraction) | | | | | |
|---|---|---|---|---|---|---|---|
| | | 19 | 20 | 21 | 22 | 23 | 24 |
| Evaporator | | | | | | | |
| Entry pressure | bara | 3.47 | 2.84 | 3.13 | 3.08 | 2.72 | 2.54 |
| Midpoint | C. | −32.5 | −32.5 | −32.5 | −32.5 | −32.5 | −32.5 |
| Glide | C. | 5 | 5 | 5 | 5 | 5 | 5 |
| Exit pressure | bara | 1.97 | 1.57 | 1.80 | 2.55 | 1.41 | 1.53 |
| Enthalpy gain | kWc | 1.000 | 1.000 | 1.000 | 1.000 | 1.000 | 1.000 |
| IHX low pressure side | | | | | | | |
| Enthalpy transferred to liquid line | kW/kWc | 1.175 | 0.649 | 1.016 | 0.891 | 0.630 | 0.583 |
| Exit temperature | | 7.6 | −11.9 | −6.4 | −16.1 | −13.9 | −14.5 |
| Dew point | | −5.5 | −18.4 | −5.0 | −15.7 | −9.8 | −10.2 |
| Compressor | | | | | | | |
| Entry temperature to compressor | C. | 7.6 | −11.9 | −6.4 | −16.1 | −13.9 | −14.5 |
| Discharge temperature | C. | 68.2 | 61.0 | 70.3 | 67.5 | 69.6 | 66.6 |
| Compression ratio P/P | | 10.78 | 12.61 | 11.48 | 8.69 | 14.17 | 12.63 |
| System | | | | | | | |
| Suction specific volume | kJ/m^3 | 925 | 971 | 890 | 1274 | 796 | 883 |
| Electrical energy input | kJ/kWc | 0.439 | 0.395 | 0.521 | 0.466 | 0.559 | 0.525 |
| COP cooling | | 2.28 | 2.53 | 1.92 | 2.14 | 1.79 | 1.90 |
| Mass flow rate × $10^3$ | kg/kWc | 8.28 | 6.96 | 8.45 | 7.48 | 7.97 | 7.41 |

TABLE 5

| | | Composition (mass fraction) | |
|---|---|---|---|
| | | 25 | 26 |
| HFO1224yd(Z) | | 0.05 | 0.1 |
| carbon dioxide | | 0.69 | 0.67 |
| HFO1234yf | | 0 | 0.23 |
| HFO1234ze(E) | | 0.26 | 0 |
| Condenser | | | |
| Exit temperature | C. | 35 | 35 |
| Exit quality | m/m | 0.0618 | 0.0618 |
| IHX high pressure condensation | | | |
| Liquid exit/suction entry difference | kJ/kg | 5.00 | 5.00 |
| Evaporator | | | |
| Entry temperature | C. | 10 | 10 |
| Exit temperature | C. | 18 | 18 |
| Exit quality | m/m | 0.900 | 0.900 |
| Compressor | | | |
| Isentropic efficiency | | 0.7 | 0.7 |
| Electric motor efficiency | | 0.9 | 0.9 |
| Output | | | |
| Condenser | | | |
| Pressure | bara | 60.42 | 60.67 |
| Dew point | C. | 53.27 | 52.95 |
| Mid point | C. | 44.13 | 43.97 |
| Glide | K | 18.3 | 17.9 |
| Enthalpy loss | kW | 1.346 | 1.333 |
| Exit quality | | 0.062 | 0.062 |
| IHX high pressure side | | | |
| Enthalpy transferred from suction line | kJ/kWc | 0.223 | 0.237 |
| Bubble point | C. | 34.5 | 34.5 |
| Exit temperature | C. | 23.0 | 22.6 |
| Evaporator | | | |
| Entry pressure | bara | 35.12 | 35.45 |
| Midpoint | C. | 14 | 14 |
| Glide | C. | 8 | 8 |
| Exit pressure | bara | 24.82 | 26.62 |
| Enthalpy gain | kWc | 1.000 | 1.000 |

TABLE 5-continued

| | | Composition (mass fraction) | |
|---|---|---|---|
| | | 25 | 26 |
| IHX low pressure side | | | |
| Enthalpy transferred to liquid line | kW/kWc | 0.223 | 0.237 |
| Exit temperature | | 30.0 | 31.4 |
| Dew point | | 25.0 | 26.6 |
| Compressor | | | |
| Entry temperature to compressor | C. | 30.0 | 31.4 |
| Discharge temperature | C. | 108.9 | 103.6 |
| Compression ratio P/P | | 2.43 | 2.28 |
| System | | | |
| Suction specific volume | kJ/m^3 | 10780 | 11156 |
| Electrical energy input | kJ/kWc | 0.311 | 0.297 |
| COP cooling | | 3.21 | 3.37 |
| Mass flow rate | kg/kWc | 0.00587 | 0.00623 |

TABLE 6

| | | Composition (mass fraction) | |
|---|---|---|---|
| HFO1224ydz | | 0.08 | 0.1 |
| carbon dioxide | | 0.7 | 0.7 |
| HFO1234yf | | 0 | 0.2 |
| HFO1234zee | | 0.22 | 0 |
| GWP | | 2 | 2 |
| Cooling duty | kW | 1 | 1 |
| Input | | | |
| Condenser | | | |
| Exit temperature | C. | 35 | 35 |
| Exit quality | m/m | 0.0228 | 0.0605 |
| IHX high pressure condensation | | | |
| Liquid exit/suction entry difference | kJ/kg | 5.00 | 5.00 |

TABLE 6-continued

| | | Composition (mass fraction) | |
|---|---|---|---|
| Evaporator | | | |
| Entry temperature | C. | 10 | 10 |
| Exit temperature | C. | 18 | 18 |
| Exit quality | m/m | 0.923 | 0.923 |
| Compressor | | | |
| Isentropic efficiency | | 0.7 | 0.7 |
| Electric motor efficiency | | 0.9 | 0.9 |
| Output | | | |
| Condenser | | | |
| Pressure | bara | 61 | 61 |
| Dew point | C. | 53.04 | 51.32 |
| Mid point | C. | 44.02 | 43.16 |
| Glide | K | 18.0 | 16.3 |
| Enthalpy loss | kW | 1.363 | 1.349 |
| Exit quality | | 0.023 | 0.061 |
| IHX high pressure side | | | |
| Enthalpy transferred from suction line | kJ/kWc | 0.184 | 0.193 |
| Bubble point | C. | 34.8 | 34.5 |
| Exit temperature | C. | 24.0 | 26.0 |
| Evaporator | | | |
| Entry pressure | bara | 35.26 | 35.17 |
| Midpoint | C. | 14 | 14 |
| Glide | C. | 8 | 8 |
| Exit pressure | bara | 24.01 | 25.63 |
| Enthalpy gain | kWc | 1.000 | 1.000 |
| IHX low pressure side | | | |
| Enthalpy transferred to liquid line | kW/kWc | 0.184 | 0.193 |
| Exit temperature | | 29.4 | 29.6 |
| Dew point | | 24.4 | 24.4 |
| Compressor | | | |
| Entry temperature to compressor | C. | 29.4 | 29.6 |
| Discharge temperature | C. | 113.2 | 106.4 |
| Compression ratio P/P | | 2.55 | 2.38 |
| System | | | |
| Suction specific volume | kJ/m^3 | 10484 | 10753 |
| Electrical energy input | kJ/kWc | 0.327 | 0.314 |
| COP cooling | | 3.06 | 3.19 |
| Mass flow rate | kg/kWc | 0.00578 | 0.00613 |

TABLE 7a

| | | Composition (mass fraction) | | | | |
|---|---|---|---|---|---|---|
| | | 29 | 30 | 31 | 32 | 33 |
| carbon dioxide | | 0.4 | 0.4 | 0.4 | 0.38 | 0.38 |
| HFO1224ydz | | 0.1 | 0.1 | 0.08 | 0.08 | 0.08 |
| HFO1234yf | | 0.42 | 0.4 | 0.38 | 0.37 | 0.37 |
| HFC1234zee | | 0.05 | 0.08 | 0.12 | 0.12 | 0.12 |
| HFC152a | | 0.03 | 0.02 | 0.02 | 0.05 | 0.025 |
| HFC227ea | | 0 | 0 | 0 | 0 | 0.045 |
| HFC32 | | 0 | 0 | 0 | 0 | 0 |
| Output | kW | 1 | 1 | 1 | 1 | 1 |
| GWP | | 7 | 6 | 6 | 10 | 150 |
| Input | | | | | | |
| Condenser | | | | | | |
| Exit temperature | C. | 30 | 30 | 30 | 30 | 30 |
| Exit quality | m/m | 0 | 0 | 0 | 0 | 0 |
| ICEX high pressure condensation | | | | | | |
| Liquid exit/suction entry difference | kJ/kg | 5 | 5 | 5 | 5 | 5 |
| Evaporator | | | | | | |
| Entry temperature | C. | −35 | −35 | −35 | −35 | −35 |
| Exit temperature | C. | −30 | −30 | −30 | −30 | −30 |
| Exit quality | m/m | 1 | 1 | 1 | 1 | 1 |
| Compressor | | | | | | |
| Isentropic efficiency | | 0.7 | 0.7 | 0.7 | 0.7 | 0.7 |
| Electric motor efficiency | | 0.9 | 0.9 | 0.9 | 0.9 | 0.9 |
| Enthalpy removed from compressor | kW/kWc | 0.417 | 0.418 | 0.416 | 0.409 | 0.425 |
| Output | | | | | | |
| Condenser | | | | | | |
| Pressure | bara | 40.13 | 40.14 | 39.91 | 38.22 | 38.36 |
| Dew point | C. | 63.7 | 63.8 | 62.8 | 63.3 | 63.7 |
| Mid point | C. | 46.8 | 46.9 | 46.4 | 46.6 | 46.8 |
| Glide | K | 33.7 | 33.8 | 32.8 | 33.3 | 33.7 |
| Enthalpy loss | kW | 1.673 | 1.675 | 1.634 | 1.613 | 1.605 |
| Exit quality | | 0.000 | 0.000 | 0.000 | 0.000 | 0.000 |
| IHX high pressure side | | | | | | |
| Enthalpy transferred to suction line | kJ/kWc | 0.028 | 0.028 | 0.028 | 0.028 | 0.028 |
| Bubble point | C. | 30.0 | 30.0 | 30.0 | 30.0 | 30.0 |
| Exit temperature | C. | 27.9 | 27.9 | 27.9 | 27.8 | 27.8 |
| Evaporator | | | | | | |
| Entry pressure | bara | 5.00 | 4.99 | 4.90 | 4.48 | 4.48 |
| Midpoint | C. | −32.5 | −32.5 | −32.5 | −32.5 | −32.5 |

TABLE 7a-continued

| | | Composition (mass fraction) | | | | |
|---|---|---|---|---|---|---|
| | | 29 | 30 | 31 | 32 | 33 |
| Glide | C. | 5 | 5 | 5 | 5 | 5 |
| Exit pressure | bara | 1.54 | 1.53 | 1.63 | 1.55 | 1.52 |
| Enthalpy gain | kWc | 1.000 | 1.000 | 1.000 | 1.000 | 1.000 |
| Exit quality | | 1.000 | 1.000 | 1.000 | 1.000 | 1.000 |
| IHX low pressure side | | | | | | |
| Enthalpy transferred from liquid line | kW/kWc | 0.028 | 0.028 | 0.028 | 0.028 | 0.028 |
| Exit temperature | C. | −25.0 | −25.0 | −25.0 | −25.0 | −25.0 |
| Dew point | C. | −30.0 | −30.0 | −30.0 | −30.0 | −30.0 |
| Compressor | | | | | | |
| Entry temperature to casing | C. | −25.0 | −25.0 | −25.0 | −25.0 | −25.0 |
| Discharge temperature | C. | 111.7 | 111.8 | 106.7 | 104.6 | 101.3 |
| Compression ratio P/P | | 26.01 | 26.32 | 24.51 | 24.62 | 25.30 |
| Compressor cooling | kW/kWc | 0.4165 | 0.4180 | 0.4161 | 0.4093 | 0.4253 |
| System | | | | | | |
| Suction specific volume | kJ/m^3 | 733 | 725 | 779 | 760 | 736 |
| Electrical energy input | kJ/kWc | 0.606 | 0.608 | 0.570 | 0.551 | 0.545 |
| COP cooling | | 1.65 | 1.65 | 1.75 | 1.81 | 1.84 |
| Mass flow rate | kg/kWc | 0.00694 | 0.00697 | 0.00693 | 0.00682 | 0.00709 |

TABLE 7b

| | | Composition (mass fraction) | | | |
|---|---|---|---|---|---|
| | | 34 | 35 | 36 | 37 |
| carbon dioxide | | 0.405 | 0.385 | 0.39 | 0.39 |
| HFO1224ydz | | 0.08 | 0.07 | 0.07 | 0.07 |
| HFO1234yf | | 0.37 | 0.37 | 0.32 | 0.28 |
| HFO1234zee | | 0.12 | 0.15 | 0.22 | 0.22 |
| HFC152a | | 0.025 | 0.025 | 0 | 0.04 |
| HFC227ea | | 0.045 | 0.035 | 0.03 | 0.03 |
| HFC32 | | 0.05 | 0.08 | 0.075 | 0.06 |
| Output | kW | 1 | 1 | 1 | 1 |
| GWP | | 184 | 173 | 150 | 145 |
| Input | | | | | |
| Condenser | | | | | |
| Exit temperature | C. | 30 | 30 | 30 | 30 |
| Exit quality | m/m | 0 | 0 | 0 | 0 |
| ICEX high pressure condensation | | | | | |
| Liquid exit/suction entry difference | kJ/kg | 5 | 5 | 5 | 5 |
| Evaporator | | | | | |
| Entry temperature | C. | −35 | −35 | −35 | −35 |
| Exit temperature | C. | −30 | −30 | −30 | −30 |
| Exit quality | m/m | 1 | 1 | 1 | 1 |
| Compressor | | | | | |
| Isentropic efficiency | | 0.7 | 0.7 | 0.7 | 0.7 |
| Electric motor efficiency | | 0.9 | 0.9 | 0.9 | 0.9 |
| Enthalpy removed from compressor | kW/kWc | 0.412 | 0.407 | 0.410 | 0.398 |
| Output | | | | | |
| Condenser | | | | | |
| Pressure | bara | 38.39 | 36.79 | 37.27 | 36.97 |
| Dew point | C. | 61.3 | 60.3 | 60.6 | 61.2 |
| Mid point | C. | 45.6 | 45.1 | 45.3 | 45.6 |
| Glide | K | 31.3 | 30.3 | 30.6 | 31.2 |
| Enthalpy loss | kW | 1.595 | 1.546 | 1.562 | 1.577 |
| Exit quality | | 0.000 | 0.000 | 0.000 | 0.000 |
| IHX high pressure side | | | | | |
| Enthalpy transferred to suction line | kJ/kWc | 0.028 | 0.028 | 0.028 | 0.027 |
| Bubble point | C. | 30.0 | 30.0 | 30.0 | 30.0 |
| Exit temperature | C. | 27.9 | 27.8 | 27.8 | 27.8 |
| Evaporator | | | | | |
| Entry pressure | bara | 4.62 | 4.30 | 4.38 | 4.28 |
| Midpoint | C. | −32.5 | −32.5 | −32.5 | −32.5 |

TABLE 7b-continued

|  |  | Composition (mass fraction) | | | |
|---|---|---|---|---|---|
|  |  | 34 | 35 | 36 | 37 |
| Glide | C. | 5 | 5 | 5 | 5 |
| Exit pressure | bara | 1.63 | 1.67 | 1.63 | 1.59 |
| Enthalpy gain | kWc | 1.000 | 1.000 | 1.000 | 1.000 |
| Exit quality |  | 1.000 | 1.000 | 1.000 | 1.000 |
| IHX low pressure side |  |  |  |  |  |
| Enthalpy transferred from liquid line | kW/kWc | 0.028 | 0.028 | 0.028 | 0.027 |
| Exit temperature | C. | −25.0 | −25.0 | −25.0 | −25.0 |
| Dew point | C. | −30.0 | −30.0 | −30.0 | −30.0 |
| Compressor |  |  |  |  |  |
| Entry temperature to casing | C. | −25.0 | −25.0 | −25.0 | −25.0 |
| Discharge temperature | C. | 102.7 | 96.8 | 98.9 | 102.5 |
| Compression ratio P/P |  | 23.51 | 22.07 | 22.80 | 23.29 |
| Compressor cooling | kW/kWc | 0.4120 | 0.4072 | 0.4095 | 0.3985 |
| System |  |  |  |  |  |
| Suction specific volume | kJ/m^3 | 796 | 829 | 810 | 797 |
| Electrical energy input | kJ/kWc | 0.536 | 0.492 | 0.506 | 0.519 |
| COP cooling |  | 1.87 | 2.03 | 1.98 | 1.93 |
| Mass flow rate | kg/kWc | 0.00687 | 0.00679 | 0.00683 | 0.00664 |

TABLE 8a

|  |  | Composition mass % | | |
|---|---|---|---|---|
|  |  | 38 | 39 | 40 |
| carbon dioxide |  | 12 | 11 | 8 |
| HFO1234yf |  | 45 | 40 | 45 |
| HFC32 |  | 38 | 44 | 42 |
| HFO1224ydz |  | 5 | 5 | 5 |
| GWP |  | 259 | 300 | 286 |
| Input |  |  |  |  |
| Cooling duty | kW | 1 | 1 | 1 |
| Condenser |  |  |  |  |
| Bubble point | C. | 45 | 45 | 45 |
| Subcool | kJ/kg | 5 | 5 | 5 |
| Evaporator |  |  |  |  |
| Dew point | C. | 13 | 13 | 13 |
| Superheat | C. | 5 | 5 | 5 |
| Compressor |  |  |  |  |
| Isentropic efficiency |  | 0.7 | 0.7 | 0.7 |
| Electric motor efficiency |  | 0.9 | 0.9 | 0.9 |
| Output |  |  |  |  |
| Condenser |  |  |  |  |
| Pressure | bara | 32.3 | 32.1 | 29.3 |
| Dew point | C. | 57.3 | 55.8 | 55.0 |
| Bubble point | C. | 45 | 45 | 45 |
| Mid point | C. | 51.1 | 50.4 | 50.0 |
| Glide | K | 12.3 | 10.8 | 10.0 |
| Exit temperature | C. | 40 | 40 | 40 |
| Heat out | kW | −1.36 | −1.34 | −1.33 |
| Evaporator |  |  |  |  |
| Pressure | bara | 9.76 | 10.13 | 9.43 |
| Entry temperature | C. | 1.51 | 2.77 | 3.50 |
| Dew point | C. | 13 | 13 | 13 |
| Mid point | C. | 7.3 | 7.9 | 8.2 |
| Glide | K | 11.5 | 10.2 | 9.5 |
| Exit temperature | C. | 18 | 18 | 18 |
| Heat in | kW | 1 | 1 | 1 |
| Compressor |  |  |  |  |
| Entry temperature to casing | C. | 18 | 18 | 18 |
| Entry temperature to compressor | C. | 23.74 | 23.59 | 23.29 |
| Discharge temperature | C. | 100.5 | 99.6 | 95.2 |
| Compression ratio |  | 3.31 | 3.17 | 3.11 |
| Total power input | kW | 0.32 | 0.31 | 0.29 |
| Swept volume | m^3/h | 0.66 | 0.63 | 0.66 |
| System |  |  |  |  |
| Suction specific volume | kJ/m^3 | 5451 | 5732 | 5421 |
| COP cooling |  | 3.13 | 3.28 | 3.41 |
| Mass flow rate | kg/s | 0.00585 | 0.00563 | 0.00578 |

TABLE 8b

|  |  | Composition mass % | | |
|---|---|---|---|---|
|  |  | 41 | 42 | 43 |
| carbon dioxide |  | 16 | 8 | 100 |
| HFO1234yf |  | 39 | 50 | 0 |
| HFC32 |  | 40 | 40 | 0 |
| HFO1224ydz |  | 5 | 2 | 0 |
| GWP |  | 273 | 273 | 677 |
| Input |  |  |  |  |
| Cooling duty | kW | 1 | 1 | 1 |
| Condenser |  |  |  |  |
| Bubble point | C. | 45 | 45 | 45 |
| Subcool | kJ/kg | 5 | 5 | 5 |

TABLE 8b-continued

| | | Composition mass % | | |
|---|---|---|---|---|
| | | 41 | 42 | 43 |
| Evaporator | | | | |
| Dew point | C. | 13 | 13 | 7 |
| Superheat | C. | 5 | 5 | 5 |
| Compressor | | | | |
| Isentropic efficiency | | 0.7 | 0.7 | 0.7 |
| Electric motor efficiency | | 0.9 | 0.9 | 0.9 |
| Output Condenser | | | | |
| Pressure | bara | 35.8 | 29.2 | 27.9 |
| Dew point | C. | 57.8 | 54.2 | 45 |
| Bubble point | C. | 45 | 45 | 45 |
| Mid point | C. | 51.4 | 49.6 | 45 |
| Glide | K | 12.8 | 9.2 | 0 |
| Exit temperature | C. | 40 | 40 | 40 |
| Heat out Evaporator | kW | −1.37 | −1.31 | −1.28 |
| Pressure | bara | 10.69 | 9.78 | 10.12 |
| Entry temperature | C. | 0.71 | 4.78 | 7 |

TABLE 8b-continued

| | | Composition mass % | | |
|---|---|---|---|---|
| | | 41 | 42 | 43 |
| Dew point | C. | 13 | 13 | 7 |
| Mid point | C. | 6.9 | 8.9 | 7 |
| Glide | K | 12.3 | 8.2 | 0 |
| Exit temperature | C. | 18 | 18 | 12 |
| Heat in Compressor | kW | 1 | 1 | 1 |
| Entry temperature to casing | C. | 18 | 18 | 12 |
| Entry temperature to compressor | C. | 24.08 | 22.90 | 17.69 |
| Discharge temperature | C. | 105.6 | 91.3 | 99.4 |
| Compression ratio | | 3.35 | 2.99 | 2.76 |
| Total power input | kW | 0.33 | 0.28 | 0.25 |
| Swept volume | m^3/h | 0.62 | 0.64 | 0.57 |
| System | | | | |
| Suction specific volume | kJ/m^3 | 5848 | 5608 | 6345 |
| COP cooling | | 3.00 | 3.54 | 3.99 |
| Mass flow rate | kg/s | 0.00568 | 0.00592 | 0.00404 |

TABLE 9

| | | Composition (mass fraction) | | | |
|---|---|---|---|---|---|
| | | 44 | 45 | 46 | 47 |
| carbon dioxide | | 0.15 | 0.2 | 0.13 | 0.25 |
| HFO1224ydz | | 0.14 | 0.14 | 0.14 | 0.1 |
| HFC32 | | 0.21 | 0.21 | 0.21 | 0.21 |
| HFO1234ze(E) | | 0.5 | 0.45 | 0.52 | 0.44 |
| Cooling duty | kW | 1 | 1 | 1 | 1 |
| GWP | | 146 | 145 | 146 | 145 |
| Cooling duty Input Condenser | kW | 1 | 1 | 1 | 1 |
| Exit temperature | C. | 30 | 30 | 30 | 30 |
| Exit quality | m/m | 0.1 | 0.1 | 0.1 | 0.2 |
| ICEX high pressure condensation | | | | | |
| Liquid exit/suction entry difference | kJ/kg | 5 | 5 | 5 | 5 |
| Evaporator | | | | | |
| Entry temperature | C. | −35 | −35 | −35 | −35 |
| Exit temperature | C. | −30 | −30 | −30 | −30 |
| Exit quality | m/m | 0.8 | 0.8 | 0.8 | 0.8 |
| Compressor | | | | | |
| Isentropic efficiency | | 0.7 | 0.7 | 0.7 | 0.7 |
| Electric motor efficiency | | 0.9 | 0.9 | 0.9 | 0.9 |
| Enthalpy removed from compressor | kW/kWc | 0.166 | 0.193 | 0.201 | 0.209 |
| Output Condenser | | | | | |
| Pressure | bara | 21.33 | 24.85 | 19.91 | 26.51 |
| Dew point | C. | 57.2 | 58.7 | 56.3 | 55.3 |
| Mid point | C. | 43.6 | 44.4 | 43.2 | 42.6 |
| Glide | K | 27.2 | 28.7 | 26.3 | 25.3 |
| Enthalpy loss | kW | 1.666 | 1.650 | 1.590 | 1.708 |
| Exit quality | | 0.100 | 0.100 | 0.100 | 0.200 |
| IHX high pressure side | | | | | |
| Enthalpy transferred to suction line | kJ/kWc | 0.455 | 0.464 | 0.451 | 0.516 |
| Bubble point | C. | 26.8 | 27.1 | 26.8 | 24.5 |
| Exit temperature | C. | −4.4 | −5.8 | −3.8 | 5.0 |
| Evaporator | | | | | |
| Entry pressure | bara | 2.88 | 3.59 | 2.60 | 3.87 |
| Midpoint | C. | −32.5 | −32.5 | −32.5 | −32.5 |
| Glide | C. | 5 | 5 | 5 | 5 |

TABLE 9-continued

|  |  | Composition (mass fraction) | | | |
| --- | --- | --- | --- | --- | --- |
|  |  | 44 | 45 | 46 | 47 |
| Exit pressure | bara | 1.37 | 1.63 | 1.28 | 2.00 |
| Enthalpy gain | kWc | 1.000 | 1.000 | 1.000 | 1.000 |
| Exit quality |  | 0.800 | 0.800 | 0.800 | 0.800 |
| ICEX low pressure side |  |  |  |  |  |
| Enthalpy transferred from liquid line | kW/kWc | 0.455 | 0.464 | 0.451 | 0.516 |
| Exit temperature | C. | −16.8 | −15.3 | −17.4 | −15.2 |
| Dew point | C. | −21.8 | −20.3 | −22.4 | −20.2 |
| Compressor |  |  |  |  |  |
| Entry temperature to casing | C. | −16.8 | −15.3 | −17.4 | −15.2 |
| Discharge temperature | C. | 114.5 | 118.1 | 101.5 | 118.2 |
| Compression ratio P/P |  | 15.56 | 15.26 | 15.53 | 13.28 |
| Compressor cooling | kW/kWc | 0.1660 | 0.1930 | 0.2019 | 0.2097 |
| System |  |  |  |  |  |
| Suction specific volume | kJ/m^3 | 744 | 861 | 708 | 922 |
| Electrical energy input | kJ/kWc | 0.600 | 0.585 | 0.531 | 0.637 |
| COP cooling |  | 1.67 | 1.71 | 1.88 | 1.57 |
| Mass flow rate | kg/kWc | 0.00664 | 0.00643 | 0.00673 | 0.00699 |

TABLE 10

|  |  | Composition (mass fraction) | | | |
| --- | --- | --- | --- | --- | --- |
| carbon dioxide |  | 0.17 | 0.17 | 0.17 | 0.19 |
| HFO1234yf |  | 0.57 | 0.52 | 0.47 | 0.48 |
| HFC32 |  | 0.21 | 0.21 | 0.21 | 0.18 |
| HFO1234yd(Z) |  | 0.05 | 0.01 | 0.15 | 0.15 |
| GWP |  | 145 | 145 | 145 | 124 |
| Cooling duty | kW |  |  |  |  |
| Input |  |  |  |  |  |
| Condenser |  |  |  |  |  |
| Exit temperature | C. | 40 | 40 | 40 | 40 |
| Exit quality | m/m | 0.05 | 0.05 | 0.05 | 0.05 |
| Evaporator |  |  |  |  |  |
| Entry temperature | C. | 1 | 1 | 3 | 3 |
| Exit temperature | C. | 16 | 16 | 16 | 16 |
| Exit quality | m/m | 1 | 1 | 1 | 1 |
| Compressor |  |  |  |  |  |
| Isentropic efficiency |  | 0.7 | 0.7 | 0.7 | 0.7 |
| Electric motor efficiency |  | 0.9 | 0.9 | 0.9 | 0.9 |
| Enthalpy removed from compressor | kW/kWc | 0.031 | 0.030 | 0.030 | 0.030 |
| Output |  |  |  |  |  |
| Condenser |  |  |  |  |  |
| Pressure | bara | 31.83 | 32.75 | 33.76 | 35.30 |
| Dew point | C. | 56.1 | 55.9 | 55.6 | 57.1 |
| Mid point | C. | 48.1 | 48.0 | 47.8 | 48.5 |
| Glide | K | 16.1 | 15.9 | 15.6 | 17.1 |
| Enthalpy loss | kW | 1.283 | 1.284 | 1.285 | 1.303 |
| Exit quality |  | 0.050 | 0.050 | 0.050 | 0.050 |
| IHX high pressure side |  |  |  |  |  |
| Enthalpy transferred from suction line | kJ/kWc | 0.123 | 0.121 | 0.120 | 0.122 |
| Bubble point | C. | 38.9 | 39.0 | 39.0 | 39.0 |
| Exit temperature | C. | 32.8 | 33.0 | 33.1 | 33.0 |
| Evaporator |  |  |  |  |  |
| Entry pressure | bara | 11.07 | 11.46 | 12.67 | 13.35 |
| Midpoint | C. | 8.5 | 8.5 | 9.5 | 9.5 |
| Glide | C. | 15 | 15 | 13 | 13 |
| Exit pressure | bara | 11.03 | 11.43 | 11.88 | 11.94 |
| Pressure drop | bar | 0.04 | 0.03 | 0.79 | 1.41 |
| Enthalpy gain | kWc | 1.000 | 1.000 | 1.000 | 1.000 |
| Exit quality |  | 1.000 | 1.000 | 1.000 | 1.000 |

TABLE 10-continued

| | | Composition (mass fraction) | | | |
|---|---|---|---|---|---|
| IHX low pressure side | | | | | |
| Enthalpy transferred to liquid line | kW/kWc | 0.123 | 0.121 | 0.120 | 0.122 |
| Exit temperature | C. | 34.9 | 34.8 | 34.6 | 34.8 |
| Dew point | C. | 16.0 | 16.0 | 16.0 | 16.0 |
| Compressor | | | | | |
| Entry temperature to compressor | C. | 34.9 | 34.8 | 34.6 | 34.8 |
| Discharge temperature | C. | 98.9 | 99.6 | 100.4 | 103.3 |
| Compression ratio P/P | | 2.88 | 2.87 | 2.84 | 2.96 |
| Compressor cooling | kW/kWc | 0.0306 | 0.0303 | 0.0300 | 0.0304 |
| System | | | | | |
| Suction specific volume | kJ/m^3 | 5785 | 5952 | 6142 | 6077 |
| Electrical energy input | kJ/kWc | 0.255 | 0.256 | 0.257 | 0.273 |
| COP cooling | | 3.93 | 3.91 | 3.90 | 3.67 |
| Mass flow rate | kg/kWc | 0.00613 | 0.00607 | 0.00600 | 0.00608 |

The invention claimed is:

1. A refrigerant consisting essentially of:
a) a nonflammable, high volatility component consisting of $CO_2$;
b) a nonflammable low volatility component selected from the group consisting of:
HFO1224yd(Z), HFO1224yd(E), HFO1233zd(E), HFO1233zd(Z), HFO1233xf, HFO1336mzz(E), HFO1336mzz(Z), 2-bromo-3,3,3-trifluoroprop-1-ene and mixtures thereof;
c) an intermediate volatility component selected from the group consisting of: HFO1234yf, HFO1234ze(E), HFO1225ye(Z), HFO1243zf and mixtures thereof; and
d) HFC32, HFC227ea or mixtures thereof, wherein the amount of the high volatility component is in the range from 8 wt % to 25 wt %;
wherein the amount of the low volatility component is in the range from 5 wt % to 20 wt %;
wherein the amount of the intermediate volatility component is in the range from 35 wt % to 70 wt %;
wherein the amount of HFC32 when present is in the range from 18 wt % to 22 wt %;
wherein the amount of HFC227ea when present is in the range from 2 wt % to 5 wt %;
wherein the amounts of the ingredients are selected from the ranges recited to total 100 wt %; and
wherein the bubble point vapour pressure of the blend at 35° C. does not exceed 35 bara.

2. A refrigerant consisting essentially of:
a) a nonflammable, high volatility component consisting of $CO_2$;
b) a nonflammable low volatility component selected from the group consisting of:
HFO1224yd(Z), HFO1224yd(E), HFO1233zd(E), HFO1233zd(Z), HFO1233xf, HFO1336mzz(E), HFO1336mzz(Z), 2-bromo-3,3,3-trifluoroprop-1-ene and mixtures thereof;
c) an intermediate volatility component selected from the group consisting of: HFO1234yf, HFO1234ze(E), HFO1225ye(Z), HFO1243zf and mixtures thereof; and
d) optionally an HFC selected from the group consisting of HFC32, HFC227ea and R152a or mixtures thereof;
wherein the amount of the high volatility component is in the range from 5 wt % to 85 wt %;
wherein the amount of the low volatility component is in the range from 5 wt % to 80 wt %;
wherein the amount of the intermediate volatility component is in the range from 10 wt % to 90 wt %;
wherein the amount of HFC32 when present is in the range from 2 wt % to 59 wt %;
wherein the amount of HFC227ea when present is in the range from 1 wt % to 12.4 wt %;
wherein the amount of HFC152ea when present is in the range from 2 wt % to 10 wt %; and
wherein the amounts of the ingredients are selected from the ranges recited to total 100 wt %.

3. A refrigerant as claimed in claim 2 consisting essentially of:
a) a nonflammable, high volatility component consisting of $CO_2$;
b) a nonflammable low volatility component selected from the group consisting of:
HFO1224yd(Z), HFO1224yd(E), HFO1233zd(E), HFO1233zd(Z), HFO1233xf, HFO1336mzz(E), HFO1336mzz(Z), 2-bromo-3,3,3-trifluoroprop-1-ene and mixtures thereof;
c) an intermediate volatility component selected from the group consisting of: HFO1234yf, HFO1234ze(E), HFO1225ye(Z), HFO1243zf and mixtures thereof; and
d) and an HFC selected from the group consisting of HFC32, HFC227ea and mixtures thereof;
wherein the amount of the high volatility component is in the range from 5 wt % to 60 wt %;
wherein the amount of the low volatility component is in the range from 5 wt % to 40 wt %;
wherein the amount of the intermediate volatility component is in the range from 10 wt % to 65 wt %;
wherein the amount of HFC32 when present is in the range from 2 wt % to 59 wt %;
wherein the amount of HFC227ea when present is in the range from 1 wt % to 12.4 wt %;
wherein the amount of HFC152ea when present is in the range from 2 wt % to 10 wt %; and
wherein the amounts of the ingredients are selected from the ranges recited to total 100 wt %.

4. A refrigerant as claimed in claim 3 consisting essentially of:
a) a nonflammable, high volatility component consisting of $CO_2$;
b) a nonflammable low volatility component selected from the group consisting of:
HFO1224yd(Z), HFO1224yd(E), HFO1233zd(E), HFO1233zd(Z), HFO1233xf, HFO1336mzz(E), HFO1336mzz(Z), 2-bromo-3,3,3-trifluoroprop-1-ene and mixtures thereof;

c) an intermediate volatility component selected from the group consisting of: HFO1234yf, HFO1234ze(E), HFO1225ye(Z), HFO1243zf and mixtures thereof; and
d) an HFC selected from the group consisting of HFC32, HFC152a and HFC227ea and mixtures thereof;
wherein the amount of the high volatility component is in the range from 5 wt % to 30 wt %;
wherein the amount of the low volatility component is in the range from 5 wt % to 40 wt %;
wherein the amount of the intermediate volatility component is in the range from 10 wt % to 65 wt %;
wherein the amount of HFC32 when present is in the range from 22.2 wt % to 59 wt %;
wherein the amount of HFC227ea when present is in the range from 4.7 wt % to 12.4 wt %;
wherein the amount of HFC152ea when present is in the range from 3 wt % to 8 wt %; and
wherein the amounts of the ingredients are selected from the ranges recited to total 100 wt %.

5. A refrigerant as claimed in claim 3 consisting essentially of:
a) a nonflammable, high volatility component consisting of $CO_2$;
b) a nonflammable low volatility component selected from the group consisting of:
HFO1224yd(Z), HFO1224yd(E), HFO1233zd(E), HFO1233zd(Z), HFO1233xf, HFO1336mzz(E), HFO1336mzz(Z), 2-bromo-3,3,3-trifluoroprop-1-ene and mixtures thereof;
c) an intermediate volatility component selected from the group consisting of: HFO1234yf, HFO1234ze(E), HFO1225ye(Z), HFO1243zf and mixtures thereof; and
d) and an HFC selected from the group consisting of HFC32, HFC152a, HFC227ea and mixtures thereof;
wherein the amount of the high volatility component is in the range from 5 wt % to 30 wt %;
wherein the amount of the low volatility component is in the range from 5 wt % to 40 wt %;
wherein the amount of the intermediate volatility component is in the range from 10 wt % to 65 wt %;
wherein the amount of HFC32 when present is in the range from 2 wt % to 22 wt %;
wherein the amount of HFC227ea when present is in the range from 1 wt % to 4.7 wt %;
wherein the amount of HFC152ea when present is in the range from 3 wt % to 5 wt %; and
wherein the amounts of the ingredients are selected from the ranges recited to total 100 wt %.

6. A refrigerant as claimed in claim 5 consisting essentially of:
a) a nonflammable, high volatility component consisting of $CO_2$;
b) a nonflammable low volatility component selected from the group consisting of: HFO1224yd(Z), HFO1224yd(E), HFO1233zd(E), HFO1233zd(Z), HFO1233xf, HFO1336mzz(E), HFO1336mzz(Z), 2-bromo-3,3,3-trifluoroprop-1-ene and mixtures thereof;
c) an intermediate volatility component selected from the group consisting of: HFO1234yf, HFO1234ze(E), HFO1225ye(Z), HFO1243zf and mixtures thereof; and
d) HFC32;
wherein the amount of the high volatility component is in the range from 5 wt % to 30 wt %;
wherein the amount of the low volatility component is in the range from 5 wt % to 40 wt %;
wherein the amount of the intermediate volatility component is in the range from 10 wt % to 60 wt %;
wherein the amount of HFC32 is in the range from 2 wt % to 22 wt %; and
wherein the amounts of the ingredients are selected from the ranges recited to total 100 wt %.

7. A refrigerant as claimed in claim 6 consisting essentially of:
a) a nonflammable, high volatility component consisting of $CO_2$;
b) a nonflammable low volatility component selected from the group consisting of:
HFO1224yd(Z), HFO1224yd(E), HFO1233zd(E), HFO1233zd(Z), HFO1233xf, HFO1336mzz(E), HFO1336mzz(Z), 2-bromo-3,3,3-trifluoroprop-1-ene and mixtures thereof;
c) an intermediate volatility component selected from the group consisting of: HFO1234yf, HFO1234ze(E), HFO-1225ye(Z), HFO1243zf and mixtures thereof; and
d) HFC32;
wherein the amount of the high volatility component is in the range from 6 wt % to 25 wt %;
wherein the amount of the low volatility component is in the range from 7 wt % to 30 wt %;
wherein the amount of the intermediate volatility component is in the range from 40 wt % to 60 wt %;
wherein the amount of HFC32 is in the range from 10 wt % to 21.5 wt %; and
wherein the amounts of the ingredients are selected from the ranges recited to total 100 wt %.

8. A refrigerant as claimed in claim 5 consisting essentially of:
a) a nonflammable, high volatility component consisting of $CO_2$;
b) a nonflammable low volatility component selected from the group consisting of:
HFO1224yd(Z), HFO1224yd(E), HFO1233zd(E), HFO1233zd(Z), HFO1233xf, HFO1336mzz(E), HFO1336mzz(Z), 2-bromo-3,3,3-trifluoroprop-1-ene and mixtures thereof;
c) an intermediate volatility component selected from the group consisting of: HFO1234yf, HFO1234ze(E), HFO-1225ye(Z), HFO1243zf and mixtures thereof; and
d) HFC32;
wherein the amount of the high volatility component is in the range from 5 wt % to 15 wt %;
wherein the amount of the low volatility component is in the range from 6 wt % to 35 wt %;
wherein the amount of the intermediate volatility component is in the range from 46 wt % to 55 wt %;
wherein the amount of HFC32 is in the range from 15 wt % to 21.5 wt %; and
wherein the amounts of the ingredients are selected from the ranges recited to total 100 wt %.

9. A refrigerant as claimed in claim 5 consisting essentially of:
a) a nonflammable, high volatility component consisting of $CO_2$;
b) a nonflammable low volatility component selected from the group consisting of:
HFO1224yd(Z), HFO1224yd(E), HFO1233zd(E), HFO1233zd(Z), HFO1233xf, HFO1336mzz(E), HFO1336mzz(Z), 2-bromo-3,3,3-trifluoroprop-1-ene and mixtures thereof;

c) an intermediate volatility component selected from the group consisting of: HFO1234yf, HFO1234ze(E), HFO1225ye(Z), HFO1243zf and mixtures thereof; and
d) HFC227ea;
wherein the amount of the high volatility component is in the range from 5 wt % to 30 wt %;
wherein the amount of the low volatility component is in the range from 5 wt % to 40 wt %;
wherein the amount of the intermediate volatility component is in the range from 10 wt % to 65 wt %;
wherein the amount of HFC227ea is in the range from 2 wt % to 4.7 wt %; and
wherein the amounts of the ingredients are selected from the ranges recited to total 100 wt %.

10. A refrigerant as claimed in claim 2 consisting essentially of:
a) a nonflammable, high volatility component consisting of $CO_2$;
b) a nonflammable low volatility component selected from the group consisting of:
HFO1224yd(Z), HFO1224yd(E), HFO1233zd(E), HFO1233zd(Z), HFO1233xf, HFO1336mzz(E), HFO1336mzz(Z), 2-bromo-3,3,3-trifluoroprop-1-ene and mixtures thereof;
c) an intermediate volatility component selected from the group consisting of: HFO1234yf, HFO1234ze(E), HFO1225ye(Z), HFO1243zf and mixtures thereof; and
wherein the amount of the high volatility component is in the range from 5 wt % to 90 wt %;
wherein the amount of the low volatility component is in the range from 2 wt % to 40 wt %;
wherein the amount of the intermediate volatility component is in the range from 15 wt % to 60 wt %; and
wherein the amounts of the ingredients are selected from the ranges recited to total 100 wt %.

11. A refrigerant as claimed in claim 10 consisting essentially of:
a) a nonflammable, high volatility component consisting of $CO_2$;
b) a nonflammable low volatility component selected from the group consisting of:
HFO1224yd(Z), HFO1224yd(E), HFO1233zd(E), HFO1233zd(Z), HFO1233xf, HFO1336mzz(E), HFO1336mzz(Z), 2-bromo-3,3,3-trifluoroprop-1-ene and mixtures thereof;
c) an intermediate volatility component selected from the group consisting of: HFO1234yf, HFO1234ze(E), HFO1225ye(Z), HFO1243zf and mixtures thereof; and
wherein the amount of the high volatility component is in the range from 5 wt % to 80 wt %;
wherein the amount of the low volatility component is in the range from 2 wt % to 40 wt %;
wherein the amount of the intermediate volatility component is in the range from 15 wt % to 60 wt %; and
wherein the amounts of the ingredients are selected from the ranges recited to total 100 wt %.

12. A refrigerant as claimed in claim 11 consisting essentially of:
a) a nonflammable, high volatility component consisting of $CO_2$;
b) a nonflammable low volatility component selected from the group consisting of:
HFO1224yd(Z), HFO1224yd(E), HFO1233zd(E), HFO1233zd(Z), HFO1233xf, HFO1336mzz(E), HFO1336mzz(Z), 2-bromo-3,3,3-trifluoroprop-1-ene and mixtures thereof;
c) optionally an intermediate volatility component selected from the group consisting of:
HFO1234yf, HFO1234ze(E), HFO1225ye(Z), HFO1243zf and mixtures thereof; and
wherein the amount of the high volatility component is in the range from 50 wt % to 75 wt %;
wherein the amount of the low volatility component is in the range from 2 wt % to 25 wt %;
wherein the amount of the intermediate volatility component is in the range from 15 wt % to 35 wt %; and
wherein the amounts of the ingredients are selected from the ranges recited to total 100 wt %.

13. A refrigerant as claimed in claim 12 consisting essentially of:
a) a nonflammable, high volatility component consisting of $CO_2$;
b) a nonflammable low volatility component selected from the group consisting of:
HFO1224yd(Z), HFO1224yd(E), HFO1233zd(E), HFO1233zd(Z), HFO1233xf, HFO1336mzz(E), HFO1336mzz(Z), 2-bromo-3,3,3-trifluoroprop-1-ene and mixtures thereof;
c) optionally an intermediate volatility component selected from the group consisting of:
HFO1234yf, HFO1234ze(E), HFO1225ye(Z), HFO1243zf and mixtures thereof;
wherein the amount of the high volatility component is in the range from 60 wt % to 75 wt %;
wherein the amount of the low volatility component is in the range from 2 wt % to 20 wt %;
wherein the amount of the intermediate volatility component is in the range from 15 wt % to 30 wt %; and
wherein the amounts of the ingredients are selected from the ranges recited to total 100 wt %.

14. A refrigerant as claimed in claim 2 consisting essentially of:
a) a nonflammable, high volatility component consisting of $CO_2$;
b) a nonflammable low volatility component selected from the group consisting of:
HFO1224yd(Z), HFO1224yd(E), HFO1233zd(E), HFO1233zd(Z), HFO1233xf, HFO1336mzz(E), HFO1336mzz(Z), 2-bromo-3,3,3-trifluoroprop-1-ene and mixtures thereof;
c) optionally an intermediate volatility component selected from the group consisting of:
HFO1234yf, HFO1234ze(E), HFO1225ye(Z), HFO1243zf and mixtures thereof; and
wherein the amount of the high volatility component is in the range from 5 wt % to 60 wt %;
wherein the amount of the low volatility component is in the range from 5 wt % to 40 wt %;
wherein the amount of the intermediate volatility component is in the range from 10 wt % to 75 wt %; and
wherein the amounts of the ingredients are selected from the ranges recited to total 100 wt %.

15. A refrigerant as claimed in claim 14 consisting essentially of:
a) a nonflammable, high volatility component consisting of $CO_2$;
b) a nonflammable low volatility component selected from the group consisting of:
HFO1224yd(Z), HFO1224yd(E), HFO1233zd(E), HFO1233zd(Z), HFO1233xf, HFO1336mzz(E), HFO1336mzz(Z), 2-bromo-3,3,3-trifluoroprop-1-ene and mixtures thereof;

c) an intermediate volatility component selected from the group consisting of: HFO1234yf, HFO1234ze(E), HFO1225ye(Z), HFO1243zf and mixtures thereof; and wherein the amount of the high volatility component is in the range from 10 wt % to 50 wt wherein the amount of the low volatility component is in the range from 5 wt % to 35 wt %;

wherein the amount of the intermediate volatility component is in the range from 12 wt % to 70 wt %; and wherein the amounts of the ingredients are selected from the ranges recited to total 100 wt %.

16. A refrigerant as claimed in claim 15 consisting essentially of:
    a) a nonflammable, high volatility component consisting of $CO_2$;
    b) a nonflammable low volatility component selected from the group consisting of:
    HFO1224yd(Z), HFO1224yd(E), HFO1233zd(E), HFO1233zd(Z), HFO1233xf, HFO1336mzz(E), HFO1336mzz(Z), 2-bromo-3,3,3-trifluoroprop-1-ene and mixtures thereof;
    c) an intermediate volatility component selected from the group consisting of: HFO1234yf, HFO1234ze(E), HFO1225ye(Z), HFO1243zf and mixtures thereof; and
    wherein the amount of the high volatility component is in the range from 10 wt % to 40 wt %;
    wherein the amount of the intermediate volatility component is in the range from 15 wt % to 55 wt %;
    wherein the amount of the low volatility component is in the range from 7 wt % to 25 wt %; and
    wherein the amounts of the ingredients are selected from the ranges recited to total 100 wt %.

17. A refrigerant as claimed in claim 16 consisting essentially of:
    a) a nonflammable, high volatility component $CO_2$;
    b) a nonflammable low volatility component selected from the group consisting of:
    HFO1224yd(Z), HFO1224yd(E), HFO1233zd(E), HFO1233zd(Z), HFO1233xf, HFO1336mzz(E), HFO1336mzz(Z), 2-bromo-3,3,3-trifluoroprop-1-ene and mixtures thereof;
    c) an intermediate volatility component selected from the group consisting of: HFO1234yf, HFO1234ze(E), HFO-1225ye(Z), HFO1243zf and mixtures thereof; and
    wherein the amount of the high volatility component is in the range from 20 wt % to 40 wt %;
    wherein the amount of the intermediate volatility component is in the range from 30 wt % to 55 wt %;
    wherein the amount of the low volatility component is in the range from 7 wt % to 25 wt %; and
    wherein the amounts of the ingredients are selected from the ranges recited to total 100 wt %.

18. A refrigerant as claimed in claim 4 for use in new equipment and for retrofitting for use in existing equipment consisting essentially of:
    a) a nonflammable, high volatility component consisting of $CO_2$;
    b) a nonflammable low volatility component selected from the group consisting of:
    HFO1224yd(Z), HFO1224yd(E), HFO1233zd(E), HFO1233zd(Z), HFO1233xf, HFO1336mzz(E), HFO1336mzz(Z), 2-bromo-3,3,3-trifluoroprop-1-ene and mixtures thereof;
    c) an intermediate volatility component selected from the group consisting of: HFO1234yf, HFO1234ze(E), HFO-1225ye(Z), HFO1243zf and mixtures thereof; and
    d) HFC32;
    wherein the amount of the high volatility component is in the range from 8 wt % to 19 wt %;
    wherein the amount of the low volatility component is in the range from 5 wt % to 8 wt %;
    wherein the amount of the intermediate volatility component is in the range from 39 wt % to 51 wt %;
    wherein the amount of HFC32 is in the range from 35 wt % to 44 wt %;
    wherein the amounts of the ingredients are selected from the ranges recited to total 100 wt %; and
    wherein the bubble point vapour pressure of the blend at 40° C. does not exceed 30 bara.

19. A refrigerant as claimed in claim 3 consisting essentially of:
    a) a nonflammable, high volatility component consisting of $CO_2$;
    b) a nonflammable low volatility component selected from the group consisting of:
    HFO1224yd(Z), HFO1224yd(E), HFO1233zd(E), HFO1233zd(Z), HFO1233xf, HFO1336mzz(E), HFO1336mzz(Z), 2-bromo-3,3,3-trifluoroprop-1-ene and mixtures thereof;
    c) an intermediate volatility component selected from the group consisting of: HFO1234yf, HFO1234ze(E), HFO-1225ye(Z), HFO1243zf and mixtures thereof; and d) HFC32, HFC227ea or mixtures thereof, wherein the amount of the high volatility component is in the range from 10 wt % to 35 wt %;
    wherein the amount of the low volatility component is in the range from 5 wt % to 20 wt %;
    wherein the amount of the intermediate volatility component is in the range from 40 wt % to 80 wt %;
    wherein the amount of HFC32 when present is in the range from 18 wt % to 22 wt %;
    wherein the amount of HFC227ea when present is in the range from 2 wt % to 4.5 wt %;
    wherein the amounts of the ingredients are selected from the ranges recited to total 100 wt % and wherein the bubble point vapour pressure of the blend at 35° C. does not exceed 30 bara.

* * * * *